United States Patent [19]
Johri et al.

[11] Patent Number: 4,918,653
[45] Date of Patent: Apr. 17, 1990

[54] TRUSTED PATH MECHANISM FOR AN OPERATING SYSTEM

[75] Inventors: Abhai Johri; Gary L. Luckenbaugh, both of Gaithersburg, Md.

[73] Assignee: International Business Machines Corporation, Armonk, N.Y.

[21] Appl. No.: 149,446

[22] Filed: Jan. 28, 1988

[51] Int. Cl.$^4$ ............................................ H04L 9/00
[52] U.S. Cl. ............................... 364/900; 340/825.31; 364/918.7; 364/949.96
[58] Field of Search ... 364/200 MS File, 900 MS File, 364/300 MS File; 340/825.31

[56] References Cited

U.S. PATENT DOCUMENTS

| | | | |
|---|---|---|---|
| 4,218,738 | 8/1980 | Matyas et al. | 364/200 |
| 4,227,253 | 10/1980 | Ehrsam et al. | 364/200 |
| 4,310,720 | 1/1982 | Check | 364/900 |
| 4,430,728 | 2/1984 | Beitel et al. | 364/900 |
| 4,531,023 | 7/1985 | Levine | 364/900 |
| 4,652,990 | 3/1987 | Pailen et al. | 364/200 |
| 4,677,546 | 6/1987 | Freeman | 364/200 |
| 4,694,396 | 9/1987 | Weisshaar et al. | 364/200 |
| 4,742,447 | 5/1988 | Duvall et al. | 364/200 |
| 4,754,395 | 6/1988 | Weisshaar et al. | 364/200 |

OTHER PUBLICATIONS

T. A. Berson, et al., "KSOS—Development Methodology for a Secure Operating System", Proc. of the Natl. Comp. Conf., vol. 48, AFIPS Press, 1979, Montvale, N.J., pp. 365-372.
S. Kramer, "Linus IV—An Experiment in Computer Security", Proc. of the 1984 Symposium on Security and Privacy, Oakland, Calif., Apr. 1984, pp. 24-33.
G. J. Popek, et al., "UCLA Secure Unix", Proc. of the Natl. Comp. Conf., vol. 48, AFIPS Press, 1979, Montvale, N.J., pp. 355-364.
V. D. Gligor, et al., "On the Design and Implementation of Secure Xenix Workstations", IEEE Symposium on Security, 4/86, pp. 102-117.

*Primary Examiner*—David Y. Eng
*Attorney, Agent, or Firm*—John E. Hoel

[57] ABSTRACT

The trusted path mechanism invention guarantees that data typed by a user on a terminal keyboard is protected from any intrusion by unauthorized programs. It allows a user to create a non-forgeable and non-penetrable communication path between the user's terminal and the trusted operating system software. The user can create a trusted path by simply pressing a key, called the Secure Attention Key (SAK), on the terminal keyboard. This operation can be called when the user logs into the system in order to be sure that the user is communicating with the real login program and not a Trojan horse program masquerading as a login program, which could steal the user's password. After the user establishes the trusted path, he can enter his critical data, such as a password, and can be sure that his critical data is not being stolen by an intruder's program. Then, after the user logs out, he can be sure that the trusted path has actually logged him out of the system so that a Trojan horse program is not capable of continuing the session started by the user.

7 Claims, 12 Drawing Sheets

FIG. 8.

"STATE DIAGRAM OF WHEN SAK IS PRESSED"

s1: BEFORE LOGIN, TALKING TO REAL LOGIN PROGRAM
s2: AFTER SUCCESSFUL LOGIN, NOT IN TRUSTED PATH
s3: AFTER SUCCESSFUL LOGIN, TRUSTED PATH (I.E. IN TRUSTED SHELL (tsh/bin/tsh))

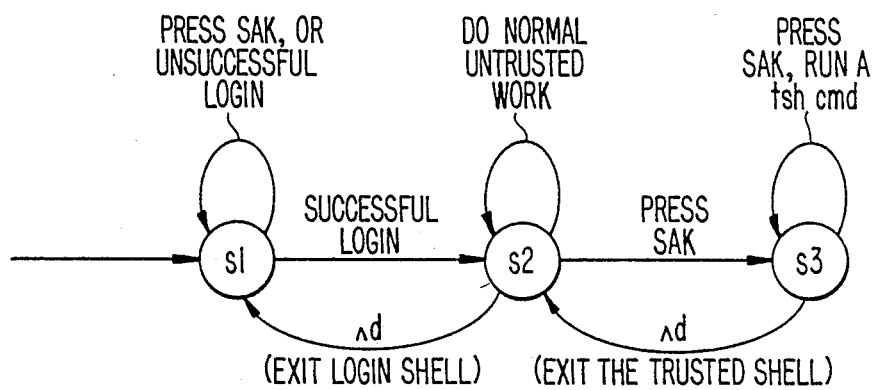

FIG. 9.

INIT IS THE PARENT (ANCESTOR) OF ALL PROCESSES

FIG. 10.

INIT CALLS FORK( ) TO CREATE A CHILD PROCESS, THEN THE CHILD EXEC'S GETTY.

GETTY IS A PROCESS THAT PRINTS THE INITIAL LOGIN PROMPT AND DETERMINES TERMINAL CHARACTERISTICS

FIG. 11.

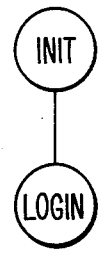

WHEN A USER TYPES HIS USER NAME TO GETTY,
GETTY EXEC'S THE LOGIN PROCESS.
THE LOGIN PROCESS PROMPTS FOR THE PASSWORD AND
VALIDATES THE PASSWORD THAT THE USER SUPPLIED.
CASE 1 LOGIN FAILS, STAY IN LOGIN PROCESS
CASE 2 LOGIN SUCCEEDS, GO TO FIG. 12.

FIG. 12.

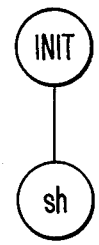

AFTER SUCCESSFUL LOGIN, THE LOGIN PROCESS EXEC'S THE
"LOGIN SHELL" SPECIFIED FOR THAT USER, e.g., /bin/sh OR sh.
sh IS AN UNTRUSTED SHELL (UNTRUSTED PROCESS) IN SECURE XENIX AND SECURE AIX.

FIG. 13.

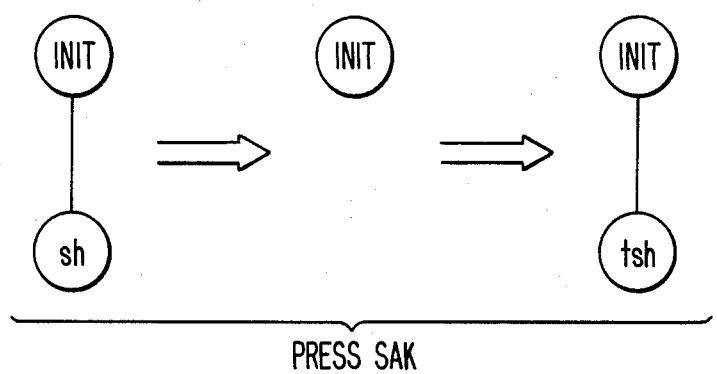

PRESS SAK

WHEN THE USER PRESSES THE SAK (SECURE ATTENTION KEY),
THE LINE DISCIPLINE DRIVER SENDS A SIGSAK SIGNAL TO
ALL PROCESSES IN THE CONTROLLING TERMINAL PROCESS GROUP.
ANY PROCESS THAT CANNOT IGNORE OR CATCH SIGSAK DIES (e.g., sh dies),
AND ITS PARENT, HERE INIT DETECTS THAT THIS CHILD DIED BY A SIGSAK
SIGNAL, THEN FORKS A NEW CHILD PROCESS THAT IN TURN EXEC'S tsh
(THE TRUSTED SHELL).

FIG. 14.

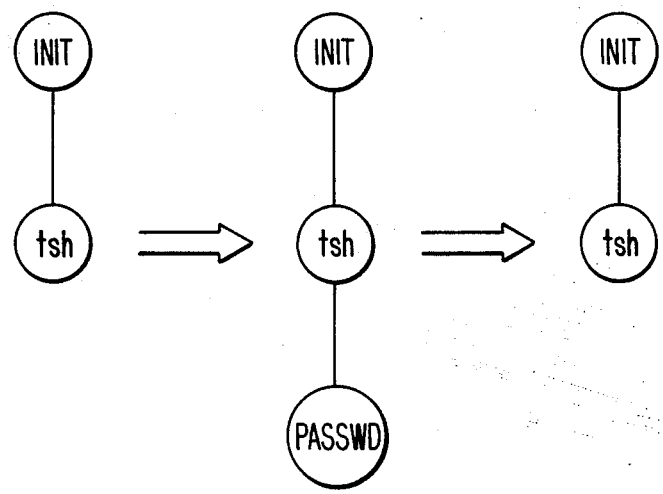

IF THE PASSWD PROGRAM IS RUN (PLAYED) FROM WITHIN tsh,
THEN tsh FORKS A CHILD PROCESS WHICH IN TURN EXEC'S PASSWD.
WHEN PASSWD IS OVER (EXITS), tsh IS STILL RUNNING.

EXIT tsh (OR EXIT THE TRUSTED PATH)

PRESS SAK

TRUSTED PATH MECHANISM FOR AN OPERATING SYSTEM

BACKGROUND OF THE INVENTION

1. Technical Field

The invention disclosed broadly relates to data processing and more particularly relates to the establishment of a trusted path between portions of a data processing system.

2. Background Art

Many data processing applications involve highly confidential information such as in financial applications, national security applications, and the like where information enters the data processing system by means of a user typing that information at a user terminal connected to the system. The prior art has not provided an effective mechanism to prevent unauthorized persons or programs from reading data from a user terminal. In prior art data processing systems, the communication path between the user's terminal and the operating system software can either be forged or penetrated by an unauthorized program known as a Trojan horse, which can masquerade as the program with which the user intends to communicate, and can divert, replicate or otherwise subvert the security of the confidential information being input by the user at his terminal.

For national security applications, the United States Government has established a standard by which the security of data processing systems can be evaluated, that standard having been published in "Trusted Computer System Evaluation Criteria," U.S. Department of Defense, December 1985, DoD publication number 5200.28-STD (referred to herein as DoD Standard). The DoD Standard defines a trusted computer system as a system that employs sufficient hardware and software integrity measures to allow its use for processing simultaneously a range of sensitive or classified information. A trusted computing base (TCB) is defined as the totality of protection mechanisms within a computer system, including hardware, firmware and software, the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters such as a user's clearance, related to the security policy. A trusted path is defined by the DoD Standard as a mechanism by which a person at a terminal can communicate directly with the trusted computing base. The trusted path mechanism can only be activated by the person or the trusted computing base and cannot be imitated by untrusted software. Trusted software is defined as the software portion of a trusted computing base.

The problem of maintaining a trusted path between a user terminal and a trusted computing base is compounded for those operating systems which accommodate multiple users. Some examples of prior art multi-user operating systems which have not provided an effective mechanism for establishing a trusted path include UNIX (UNIX is a trademark of AT&T Bell Laboratories), XENIX (XENIX is a trademark of Microsoft Corporation) and AIX (AIX is a trademark of the IBM Corporation). UNIX was developed and is licensed by AT&T as an operating system for a wide range of minicomputers and microcomputers. For more information on the UNIX Operating System, the reader is referred to "UNIX (TM) System, Users Manual, System V," published by Western Electric Company, January 1983. A good overview of the UNIX Operating System is provided by Brian W. Kernighan and Rob Pike in their book entitled "The UNIX Programming Environment," published by Prentice-Hall (1984). A more detailed description of the design of the UNIX Operating System is to be found in a book by Maurice J. Bach, "Design of the UNIX Operating System," published by Prentice-Hall (1986).

AT&T Bell Labs has licensed a number of parties to use the UNIX Operating System, and there are now several versions available. The most current version from AT&T is Version 5.3. Another version known as the Berkley version of the UNIX Operating System was developed by the University of California at Berkley. Microsoft Corporation has a version known under their trademark as XENIX.

With the announcement of the IBM RT PC (RT and RT PC are trademarks of IBM Corporation), (RISC (reduced instruction set computer) technology personal computer) in 1985, IBM Corporation released a new operating system called AIX which is compatible at the application interface level with AT&T's UNIX Operating System, Version 5.2, and includes extensions to the UNIX Operating System, Version 5.2. For a further description of the AIX Operating System, the reader is referred to "AIX Operating System Technical Reference," published by IBM Corporation, 2nd Edition (September 1986).

The invention disclosed and claimed herein specifically concerns providing a mechanism for establishing a trusted path in a multi-user operating system such as UNIX, XENIX, or AIX, so that unauthorized programs are prevented from reading data from a user terminal. None of the prior art multi-user operating systems provides a mechanism for establishing a trusted path which is effective in preventing unauthorized programs from reading data from a user terminal.

OBJECTS OF THE INVENTION

It is therefore an object of the invention to provide a mechanism for establishing a trusted path in a data processing system.

It is still a further object of the invention to provide a mechanism for establishing a path for a multi-user operating system.

It is still a further object of the invention to provide a trusted path mechanism for a UNIX (TM)-type operating system.

SUMMARY OF THE INVENTION

These and other objects, features and advantages of the invention are accomplished by the trusted path mechanism for an operating system disclosed herein. The trusted path mechanism invention guarantees that data typed by a user on a terminal keyboard is protected from any intrusion by unauthorized programs. It allows a user to create a non-forgeable and non-penetrable communication path between the user's terminal and the trusted operating system software. The user can create a trusted path by simply pressing a key, called the Secure Attention Key (SAK), on the terminal keyboard. This operation can be called when the user logs into the system in order to be sure that the user is communicating with the real login program and not a Trojan horse program masquerading as a login program, which would steal the user's password. After the user has established the trusted path, he can enter his critical data, such as a password, and can be sure that his password is not being stolen by an intruder's program. Then, after the user logs out, he can be sure that the trusted path has actually logged him out of the system so that a Trojan horse program is not capable of continuing the session started by the user.

The invention is contained in a data processing system including a memory to which is connected a plurality of terminals, with at least one terminal including a keyboard having a Secure Attention Key. It is a method in a UNIX-type operating system for creating, in response to the Secure Attention Key, a trusted path between the terminal and a trusted shell portion of a trusted computing base which is a child process of an init process under the operating system. The method includes detecting the Secure Attention Key in a keyboard device driver connected to the keyboard and outputting from the keyboard device driver to a Secure Attention Key Signal Generator, information that the Secure Attention Key has been detected. It further includes outputting from the Secure Attention Key Generator a SIGSAK signal to all processes operating in a process group of the terminal, terminating all of the processes in the terminal process group. The method further includes applying the SIGSAK signal to access authorization tables associated with all the device drivers interfacing with the terminal, to deny access authorization to all processes in the data processing system except the init process. The method further includes applying the SIGSAK signal to a file access table to remove all addressing information relating the device drivers interfacing with the terminal, to all processes in the data processing system except the init process. The method further includes executing a fork system call by the init process for a new child process. The method further includes executing an exec system call to overlay a trusted shell process onto the new child process, the trusted shell process having access authorization to the device drivers interfacing with the terminal and the trusted shell process having an addressing relationship defined in the file access table to the device drivers interfacing with the terminal. Thereby a trusted path is established between the terminal and the trusted shell process.

In this manner, a trusted path has been established for accepting and processing the user's critical data, after which the trusted path is terminated and the user can then proceed without fear of having a Trojan horse program circumvent the security of his system.

BRIEF DESCRIPTION OF THE DRAWINGS

These and other objects, features and advantages of the invention will be more fully appreciated with reference to the accompanying figures.

FIG. 8 is a state diagram illustrating when a Secure Attention Key (SAK) is pressed.

FIG. 9 shows the init process.

FIG. 10 follows FIG. 9 and shows the init calling a fork to create a child process and then the child process execs a getty process that prints the initial login prompt and determines terminal characteristics.

FIG. 11 follows FIG. 10 and shows when a user types his user name to the getty, the getty execs the login process.

FIG. 12 follows FIG. 11 showing that after a successful login, the login process execs the login shell specified for that user, for example SH.

FIG. 13 follows FIG. 12 and shows that when the user presses the Secure Attention Key (SAK) the line discipline driver sends a SIGSAK signal to all processes in the controlling terminal process group. In response, the login shell SH dies and the init process forks a new child process which in turn execs a trusted shell process TSH.

FIG. 14 follows FIG. 13 and shows that if the password program is run within the trusted shell TSH, then TSH forks a child process which in turn execs password. When the password process is over, the trusted shell TSH is still running.

FIG. 19 shows the init process creating the trusted shell TSH process.

DESCRIPTION OF THE BEST MODE FOR CARRYING OUT THE INVENTION

Figure 1:
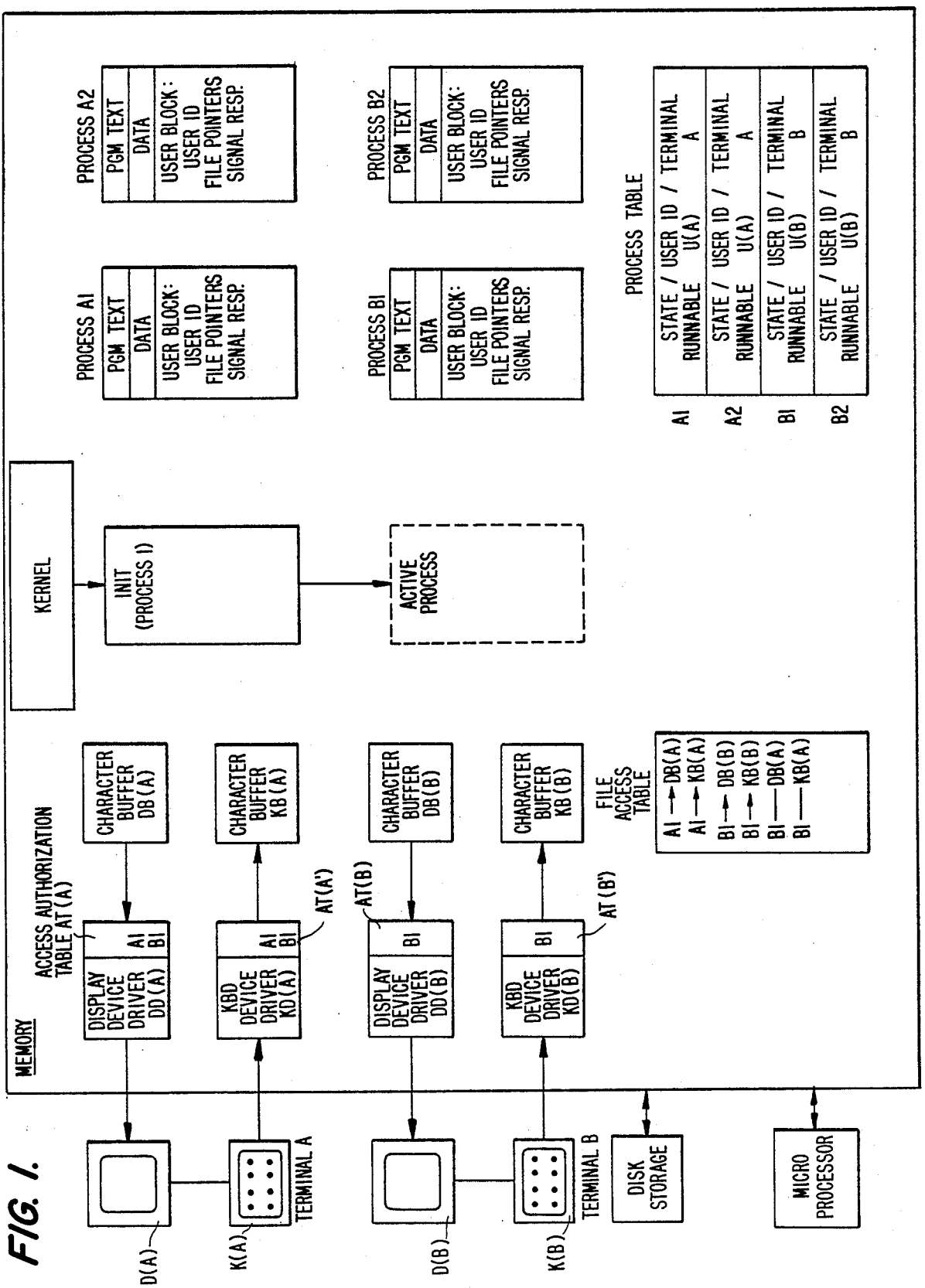
FIG. 1 is a schematic diagram of a data processor operating with a multi-user, UNIX-like operating system.

In order to provide a generalized description of the trusted path mechanism invention, FIG. 1 is presented as a schematic diagram of a data processor operating with a multi-user, UNIX-like operating system. The arrangement of FIG. 1 illustrates the typical circumstance encountered by a plurality of users sharing the same data processor, for UNIX-like operating systems. FIG. 1 shows a data processor which includes a microprocessor connected to a random access memory. Also connected to the random access memory is a disk storage upon which are maintained operating system files and user files which are selectively read into the memory. The primary UNIX-type operating system file is the kernel which is loaded into the memory and carries out initialization operations, organizing the system and opening requisite files necessary to carry on multi-user operations. Also connected to the memory are a plurality of terminals including the terminal A and the terminal B. In initializing the memory, the kernel provides a first display device driver DD(A) which interfaces with the display D(A) of the terminal A, and the corresponding character buffer DB(A) which buffers the characters sent to the display device driver DD(A). Similarly, the kernel establishes a keyboard device driver KD(A) (also known as a line discipline driver) which is connected to the keyboard K(A) of the terminal A. A character buffer KB(A) is connected to the keyboard device driver KD(A) to buffer the characters received from the keyboard of terminal A. In a similar manner, the kernel establishes the supporting structures for the display D(B) and the keyboard K(B) of the terminal B, namely the display device driver DD(B), the character buffer DB(B), the keyboard device driver KD(B) and the character buffer KB(B).

Operating system programs and application programs which operate in a UNIX-like environment are called processes and consist of three basic portions, a program text portion, a data portion and a stack and user block portion. In order for a process to interface with I/O devices such as a terminal, a file must be opened for the calling process, which names the character buffer servicing the terminal. Thus, a process such as the process A1 of FIG. 1 which is to interface with the terminal A, must open at least two files, the first file to interface with the character buffer DB(A) for the display device driver DD(A) and the second file to be opened to interface with the character buffer KB(A) for the keyboard device driver KD(A). Actual communication between a process and the corresponding character buffer with which it is to interface is carried out through a file access table, as shown in FIG. 1, which relates the particular process with the corresponding character buffer.

As is shown in FIG. 1, the terminal A has two processes associated with it, process A1 and process A2 which are collectively referred to as the terminal A process group. Correspondingly, the terminal B has two processes, process B1 and process B2 which are collectively referred to as the terminal B process group. As can be seen from the file access table shown in FIG. 1, the process A1 has opened I/O files to the display device character buffer and the keyboard device character buffer for terminal A and correspondingly, the process B1 has opened I/O files for the display device character buffer and the keyboard device character buffer of the terminal B. It is not uncommon in multi-user operating systems, to have a process associated with a first terminal process group open files to enable communication with another terminal. This can be seen with reference to the file access table of FIG. 1 wherein the process B1 has opened a file to the display device character buffer DB(A) and to the keyboard device character buffer KB(A) of the terminal A. This enables the user at terminal B to communicate with the user at terminal A.

In order to control the access by processes to the device drivers, only those processes which are authorized in an access authorization table may be permitted to communicate with a particular device driver and its character buffer. As is seen in FIG. 1, the display device driver DD(A) has an access authorization table AT(A) in which two processes are identified as being authorized, namely A1 and B1. Similarly, the keyboard device driver KD(A) has an access authorization table AT(A') which authorizes processes A1 and B1 to access that driver and its character buffer KB(A). Similarly, the device driver DD(B) has an access authorization table AT(B) which only has an authorization for the process B1. Similarly, the keyboard device driver KD(B) has an access authorization table AT(B) that contains an authorization only for the process B1. The contents of the access authorization tables can only be modified by a privileged process such as the init process for the establishment of a trusted path. However, in a nonsecure mode, the user can also access and modify the access authorization tables.

The process table shown in FIG. 1 resides in the memory and maintains an up-to-date record of the state of each respective process resident in memory along with the user ID and the terminal designation for the user authorized to run that process. As can be seen from FIG. 1, all four processes A1, A2, B1 and B2 are in a runable state, which means that in a time slice multiprogramming operation by the operating system, the processes are ready to run and when selected for service by the operating system, will be placed in a running or active state.

The security problem presented by the UNIX-like operating system depicted in FIG. 1 is that the user at terminal A cannot be sure that his secure data entries at his keyboard K(A) will not be overheard by the user at terminal B on his display D(B), since the user at terminal B can have easily opened files in one of his terminal B process group processes, which can monitor the character buffers DB(A) and KB(A) for the terminal A. Indeed this in fact has happened, as has been mentioned, and as is depicted in the file access table of FIG. 1.

A further security problem presented to the user at terminal A is that a Trojan horse program can have been appended to one of his own processes in the terminal A process group. Such a Trojan horse program would have an apparently useful function but would contain additional hidden functions that surreptitiously exploit the legitimate authorizations of the invoking or host process in the terminal A process group, to the detriment of the security of terminal A. For example, such a Trojan horse program could make a "blind copy" of a sensitive file so that an unauthorized user who was the creator of the Trojan horse program, could breach the security of terminal A.

Figure 2:
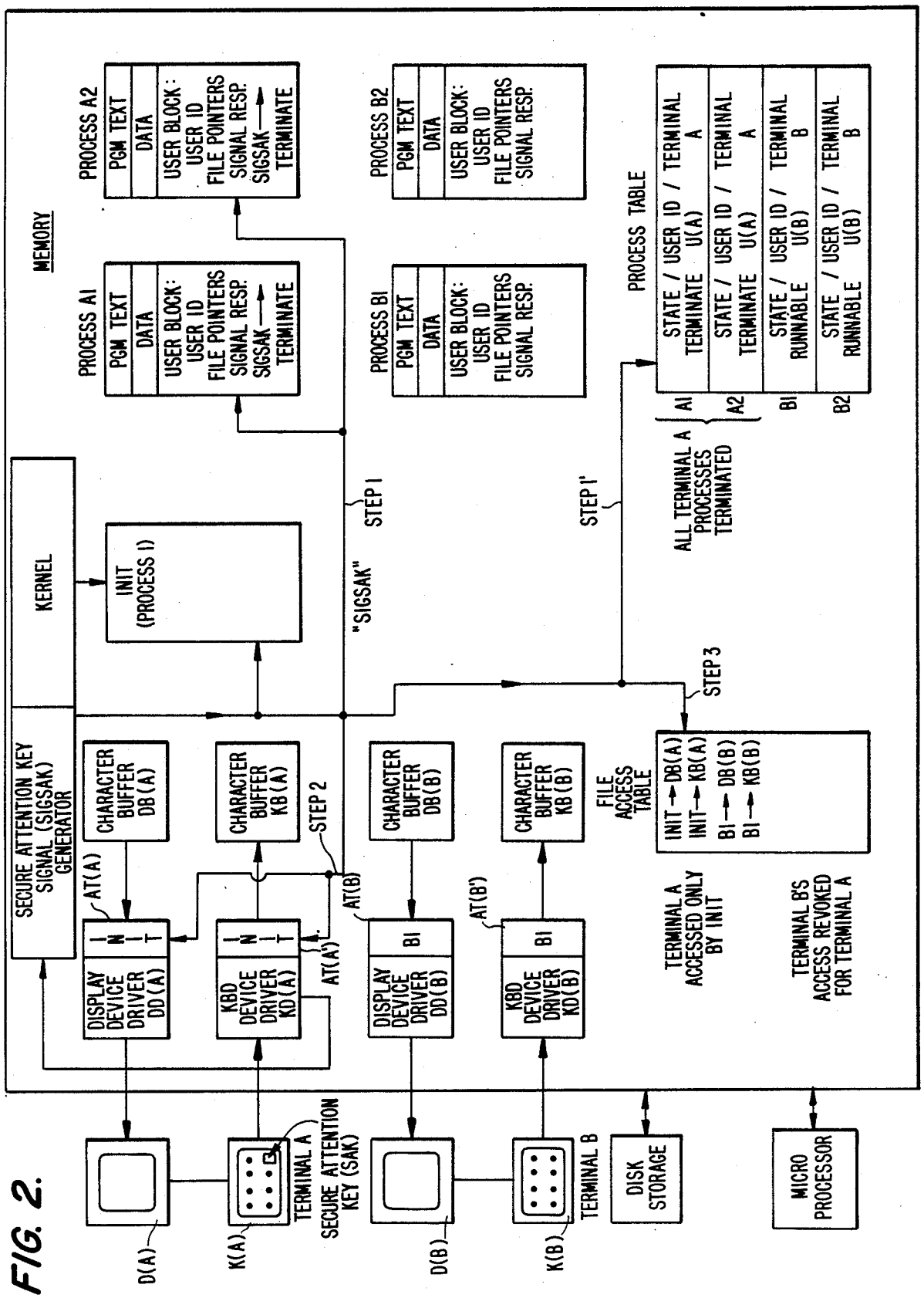
FIG. 2 is a schematic diagram of the data processor of FIG. 1, which includes the Secure Attention Key feature for invoking a trusted path, in accordance with the invention.

These security problems with UNIX-like multi-user operating systems are solved by the trusted path mechanism whose features and functions are shown in FIG. 2. FIG. 2 is a schematic diagram of the data processor of FIG. 1, which further includes the Secure Attention Key feature for invoking a trusted path, in accordance with the invention. As can be seen in FIG. 2, the keyboard K(A) of terminal A has a Secure Attention Key (SAK), in accordance with the invention. The keyboard device driver KD(A) is modified to detect the unique character combination represented by the Secure Attention Key, and to output a signal to the Secure Attention Key Signal Generator when the Secure Attention Key has been depressed. The Secure Attention Key Signal (SIGSAK) is produced by the Secure Attention Key Signal Generator in response to the signal received from the keyboard device driver KD(A). The Secure Attention Key Signal Generator is a part of a modified kernel for the UNIX-like operating system.

In accordance with the invention, the user block associated with each process stored in the memory, includes a list of signal responses to UNIX-like signals, included among those signal responses is a special response provided for the Secure Attention Key Signal (SIGSAK). When the Secure Attention Key Signal Generator directs a SIGSAK signal to a particular process or terminal process group, the stored response in the user block for that processor requires that that process be terminated. The Secure Attention Key Signal Generator can send a SIGSAK signal to all of the processes in a particular terminal process group, for example in FIG. 2 the process A1 and the process A2 for the terminal A process group, in response to the Secure Attention Key Signal Generator having received an indication from the keyboard device driver KD(A), that the Secure Attention Key has been depressed on the keyboard K(A). In response to this circumstance when the Secure Attention Key has been depressed for terminal A, step 1 is executed so that all of the processes in the terminal A process group are terminated, and a corresponding state entry is made by step 1' in the process table to show that all terminal A processes are terminated.

Further in accordance with the invention, when the Secure Attention Key Signal Generator outputs a SIGSAK, it is directed in step 2 to the access authorization table AT(A) and AT(A') canceling the authorization of the process A1 and the process A2 and inserting in its place that the only process authorized to have access to the device drivers DD(A) and KD(A) and their corresponding buffers DB(A) and KB(A) is the init process.

Still further in accordance with the invention, when the Secure Attention Key Signal Generator outputs a SIGSAK, it is also directed by step 3 to the file access table and serves to alter the file access table entries for all files which interface with the terminal A character buffers DB(A) and KB(A). Thus, the entries for terminal B which had previously enable the interface between the process B1 and the terminal A, are revoked so that no processes in the terminal B process group can communicate through the character buffers DB(A) and KB(A) with the terminal A. A command called vhangup can carry out this operation.

The kernel and the init process 1, which is the parent process for all other processes in the system, are maintained as trusted processes. Thus, in accordance with the invention, the entries in the file access table are modified so that the init process is the only process which is able to interface through the file access table with the terminal A character buffers DB(A) and KB(A). Thus, in the stage shown in FIG. 2, no other processes in the memory of the data processor are able to interface with the terminal A except the init process 1.

Figure 3:
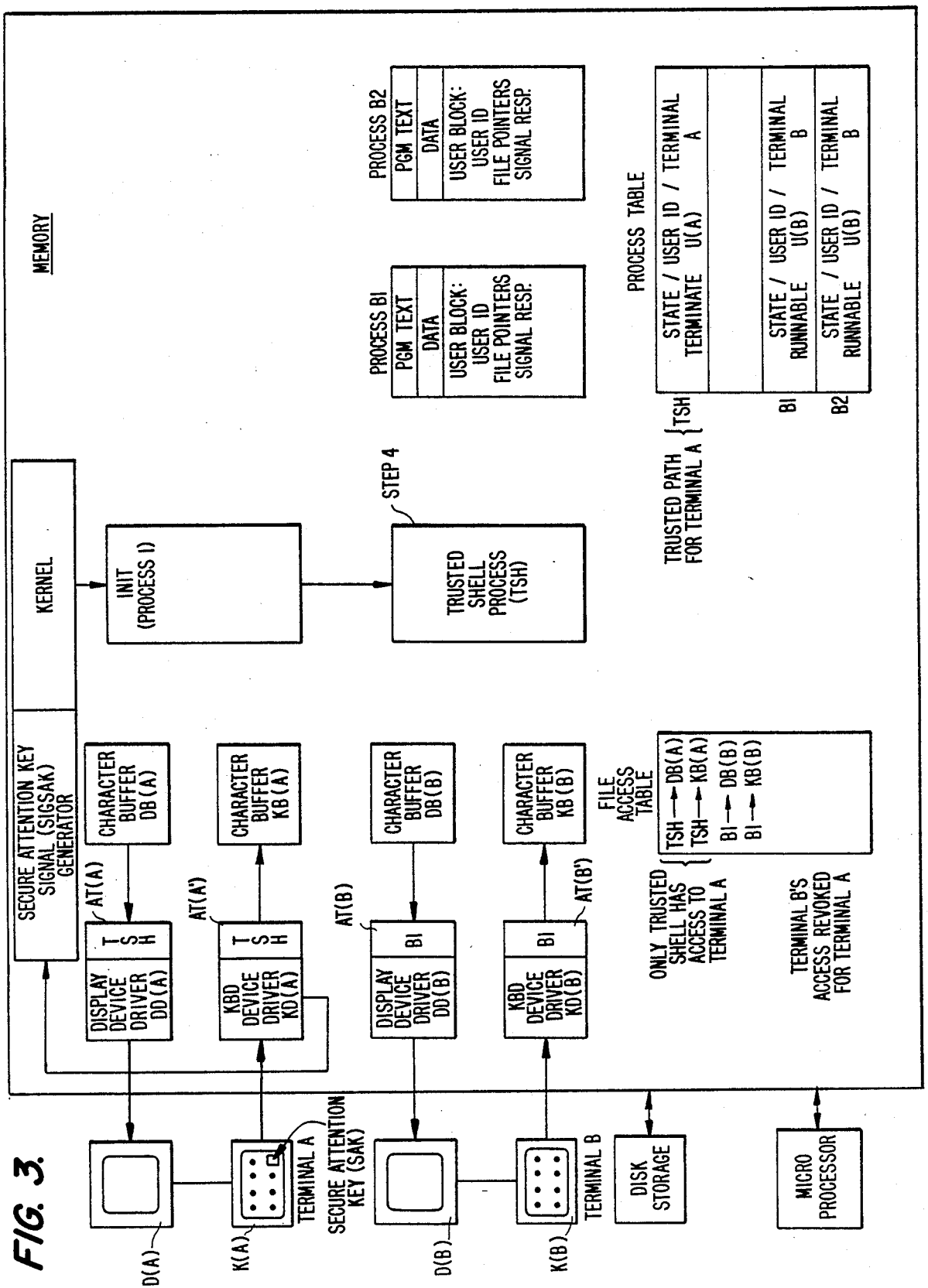
FIG. 3 is a schematic diagram of the data processor of FIG. 2, showing the establishment of the trusted path.

FIG. 3 is a schematic diagram of the data processor of FIG. 2, showing the establishment of the trusted path to a trusted shell. In accordance with the invention, the kernel includes a trusted shell process TSH which can be either a part of the kernel when read in from the disk storage device, or alternately can be a separate trusted file on the disk storage device read in at the command of the kernel. In UNIX-like operating systems, the system call "fork" creates two newly identical copies of a process. One copy is called the parent and the other the child. All parts of the image of the parent process are inherited by the child, including open files. The "fork" process has its own data and stack or user block portions. The only resources shared by a parent and child are the files that were opened when the parent underwent the "fork" system call. In accordance with the invention, the init process performs a "fork" system call in step 4 of FIG. 3, creating a child process which is nearly an identical copy of the init process. It will be this child process which performs an overlay upon itself of the image of the trusted shell process (TSH). The overlay operation is accomplished by another UNIX-like system call, the "exec" system call. The "exec" system call overlays the process that is running with a new program and begins execution of the program at its entry point. The process ID is unchanged by the "exec" system call. If successful, this call does not return and the calling program image is lost. Thus, in accordance with the invention, the child init process performs an "exec" system call using as the called program, the trusted shell process (TSH) which was read in by the kernel (or with the kernel) from the disk storage. Since the trusted shell TSH is the child process of init, the trusted shell TSH is authorized in the access authorization tables AT(A) and AT(A') to access the device driver DD(A) and KD(A). Since all other processes associated with the terminal A process group have been terminated and removed from the memory, and further, since the file access table has been modified so that no other process can interface with the character buffers of the terminal A, except the trusted shell process (TSH), there is a trusted path now established from the terminal A to the trusted shell process (TSH).

The trusted shell process (TSH) can have a variety of commands, functions, and subsidiary programs contained within it which can be called from the terminal A, in a completely secure manner. An example of this would be a secure login function whereby the user at terminal A can log in his ID and input his password without fear that an unauthorized user will be eavesdropping on his password.

Thus, in this manner, the trusted path mechanism invention enables secure communications between a user terminal and trusted processes within the data processor, without adversely affecting the ongoing data processing operations by other terminals connected to the same data processor.

The specific embodiment of the invention disclosed herein is applied to the AIX Operating System. Therefore, the following discussion provides some background for the operating principles of the AIX Operating System, which will assist the reader in understanding the invention disclosed and claimed herein. For further information on the AIX Operating System, the reader is referred to the above cited IBM publication "AIX Operating System Technical Reference."

BACKGROUND DISCUSSION OF THE AIX OPERATING SYSTEM

Since the AIX Operating System and other UNIX-like operating systems make use of a specialized set of terms, the following definitions are offered for some of those terms.

Process: A sequence of actions required to produce a desired result, such as an activity within the system begun by entering a command, running a shell program, or being started by another process.

Password: A string of characters that, when entered along with a user identification, allows an operator to sign on to the system.

Operating System: Software that controls the running of programs. In addition, an operating system may provide services such as resource allocation, scheduling, input/output control, and data management.

Kernel: In UNIX-type operating systems, the kernel implements the system call interface.

Init: After the kernel completes the basic process of initialization, it starts a process that is the ancestor of all other processes in the system, called the init process. The init process is a program that controls the state in which the system is running, normally either maintenance mode or multi-user mode.

Getty: The init process runs the getty command for each port to the system. Its primary function is to set the characteristics of the port specified.

Login: The login program logs the user onto the system, validates the user's password, makes the appropriate log entries, sets up the processing environment, and runs the command interpreter that is specified in the password file, usually the shell (SH) program.

Shell (SH): The shell command is a system command interpreter and programming language. It is an ordinary user program that reads commands entered at the keyboard and arranges for their execution.

Fork: The fork system call creates a new process called a child process, which is an exact copy of the calling process (the parent process). The created child process inherits most of the attributes of the parent process.

Exec: The exec system call executes a new program in the calling process. Exec does not create a new program, but it overlays the current program with a new one, which is called the new process image. The new process image file can be an executable binary file, an executable text file that contains a shell procedure, or a file which names an executable binary file or a shell procedure which is to be run.

Signal: Signals provide communication to an active process, forcing a single set of events where the current process environment is saved and a new one is generated. A signal is an event which interrupts the normal execution of a process and can specify a signal handler subroutine which can be called when a signal occurs.

The RT PC system software is structured in layers: the Virtual Resource Manager (VRM), the Virtual Machine Interface (VMI), and the AIX Operating System. The Virtual Resource Manager extends the hardware function of the processor and memory management to provide a high level of support to hardware devices for the operating system in a virtual machine environment. The Virtual Machine Interface is the protocol boundary between the operating system and the Virtual Resource Manager. A virtual machine as defined by the VRM has a high level but physical machine-like interface.

The Virtual Resource Manager provides a virtual machine environment that has essentially the same characteristics as the physical machine. Virtual machines run in problem (unprivileged) state and do not directly reflect the supervisory (privileged) characteristics of the physical machine. These functions are handled by the Virtual Resource Manager.

A virtual machine has two protection states, user (unprivileged) and operating system (privileged). The operating system state and AIX kernel state are synonymous. Whenever the virtual machine is executing instructions (in either user or operating system state) the processor is actually in problem state. Only the Virtual Resource Manager (including code installed in the VRM by the AIX Operating System) can execute in real supervisory state.

In user state, a virtual machine can issue any of the problem state instructions. One of the instructions available to the virtual machine is the SVC (supervisor call) instruction. The SVC instruction includes a 16-bit field to indicate which supervisor function is desired. The high-order bit of this field determines whether the call is being made to the Virtual Resource Manager (bit is set) or to the virtual machine supervisor, the AIX Operating System (bit is clear). The VRM does not accept calls to the Virtual Resource Manager made from virtual machine user state. Transition from virtual machine user state to operating system state is performed by issuing an SVC type system call from an application running in the virtual machine to the virtual machine supervisor.

A virtual machine enters operating system state either because of an SVC directed to it by a user state process or because of a virtual interrupt directed to it by the Virtual Resource Manager. In operating system state, the virtual machine can use all of the instructions available in user state. In addition, the virtual machine in operating system state can issue SVCs to the Virtual Resource Manager.

Since each virtual machine has a distinct virtual memory space starting at location 0, these locations are valid for all virtual machines. Virtual machine memory locations between 0xc0 and 0x2dc are reserved for communication between the virtual machine and the Virtual Resource Manager. These locations are used for memory-mapped timer values, Program Status Blocks (PSBs) for SVCs and interrupts, and miscellaneous other values.

There is a separate PSB for each priority interrupt level, program checks, machine communications and SVC. The PSB includes the Instruction Address Register (IAR) for the point of interrupt, interrupt control and status fields, definition of sublevels and four words of status and data specific to the interrupt.

The Virtual Resource Manager provides paging support of the virtual memory for the operating system running in a virtual machine. AIX is designed to take advantage of the virtual memory support provided by the VRM. The VRM virtual memory support makes the hardware memory management functions available to AIX while relieving it of the details of paging mechanics (page replacement algorithms, management of paging I/O, and so forth).

The interface to virtual memory consists of a set of SVCs, program check interrupts (addressing and protection exceptions), and machine communication interrupts (page fault occurrence and clearing). The basic model of memory presented to the virtual machine is in terms of segments.

SVCs are provided to create segments, copy segments, destroy segments, manipulate segment characteristics (examples are to change sizes and protection status, to load segment IDs into the hardware memory management segment registers, and so on). An SVC interface is also provided to allow AIX the ability to influence the Virtual Resource Manager page replacement algorithm. Using this interface, AIX advises the Virtual Resource Manager that certain pages should be purged from primary storage, that certain pages should be pinned in primary storage, or that previously pinned pages should be unpinned.

The AIX Operating System is UNIX System V (TM) enhancements. Among the enhancements are the facilities that utilize virtual memory. AIX runs in a virtual machine on the Virtual Resource Manager. The kernel is the heart of the AIX virtual machine operating system and as such is the manager of the various devices and resources that make up the virtual machine in which it resides. In essence, it is the focal control point for all virtual machine activity and the virtual machine resources.

The internals of the AIX have been modified and extended to allow it to run in a virtual machine, provide an extended process environment, and provide a usable and stable file system. The system call and subroutine interfaces allow many programs and utilities written for UNIX-compatible systems to run on AIX.

The kernel performs the following major functions.
File System Management:
File: open, close, read, write, change owner, get/change statistics, seek
File system: mount, unmount, get statistics
Directory: change working directory, change root directory, make a directory, link to a file, unlink to a file
Security: access permissions.
Process Management:
Start and termination: fork a process, terminate this process, kill another process, kill a process group
Set process group
Informational: enable/disable accounting, get id (process, parent, group) get times
Priority suggestion
Wait for child process to terminate
Lock data, text or stack in memory.
Signals: enable/disable signals, route signals to user routines, wait for a signal.
Semaphores: create semaphore, get semaphore id, perform semaphore operations, delete semaphore.
Memory Management:
Private memory: grow, shrink
Shared memory: create, attach, delete.
Time Management:
Set time
Get time.
Program Management:
Execute a new program
Lock a program in memory.
Resource Management:
Set and get user and group IDs
Set and get user limits Before the kernel can run, it first must be loaded into segment 0 of the virtual machine. The bootstrap program is responsible for locating the kernel on the root file system, reading it into memory, and finally giving it control.

The bootstrap program searches the root file system for the file "/unix," reads its text and data segment into memory, and extends the segment. The bootstrap program moves itself out of the way, moves the kernel to start at address 0, and then gives the kernel control at its start entry point, thus completing the boot process.

A "process" in the operating system is the current state of a program that is running. This includes a memory image (the logical layout of its parts in memory), the program text, program data, variables used, general register values, the status of opened files used, and current directory. Programs running in a process can be either operating system programs or user programs. A process must be active in order to request services to be performed by the kernel. Processes are paged into and out of memory when necessary. Processes not currently running are eligible to be paged from memory to disk.

The same process can be in either "user" mode or "kernel" mode. Normally, a user program while executing is called a user process and is considered to be in "user mode." When the process requires a function performed by the system, it calls the system as a subroutine. A process in user mode uses system calls to access system resources. This is also sometimes referred to as a kernel call. When the user process issues a system call, the environment switches from user to kernel mode. The system is running the same process. The difference is that the code running for the user process in this instance is kernel code. The process is now in "kernel mode." A process in kernel mode has full control of the system. When the kernel has completed the requested service, it usually returns control to the user mode of the process. A process in user mode can be preempted at any time. In contrast, a process in kernel mode usually cannot be preempted. Normally, a process in kernel mode runs until it voluntarily relinquishes control of the processor.

Several mechanisms can prompt a switch from user mode to kernel mode. One mechanism that causes a switch is the system timer. The system timer periodically interrupts the processor at fixed intervals per second. An interrupt is a signal that diverts the processor to a special software routine. During the service routine for the system timer, the kernel checks the priority of the processes for a possible change of process. The system scheduler performs the basic time-slicing to enable the processor to be shared among many users.

Servicing I/O requirements also causes a switch. Interrupt routines post completion of I/O operations. These routines start the next I/O operation on the device queue, mark all processes waiting for the service as ready to run, and set a flag to trigger a process switch when necessary upon return from kernel mode to user mode.

Memory management is provided to the operating system by the Virtual Resource Manager (VRM). The VRM provides the operating system with paged virtual memory. Page faults can interrupt the operating system so that it can switch to some other task. Virtual memory functions are primarily controlled by SVCs from the operating system to the VRM, with interrupts used as appropriate.

Portions of a process can be addressed when a process is running in either user or kernel mode. The 32-bit virtual address space is divided into 16 segments. Each segment is $2^{**}28$ bytes long. The segment registers provide access to the segmented virtual memory for the virtual machines. The virtual memory hardware allows a maximum of 16 concurrent segment accesses. The RT PC implementation restricts user mode processes to 14 concurrent segment accesses. A kernel mode process is permitted to concurrently access all segments accessible by the virtual machine. The segment registers provide several mechanisms for protecting the memory segments: by selective segment address loading into segment registers, and by page protection bit setting in each segment register. The protection settings provide a mechanism to invoke read and/or write protection in either machine state.

Each segment register maps part or all of a logical RT PC program segment. All addresses are full 32-bit virtual addresses with the segment number occupying the leftmost four bits. The segment registers are a part of the process image and are therefore switched on each process dispatch. The kernel is mapped by segment register 0. This includes the kernel program text, data, and all I/O buffers. This mapping is fixed. The user program text segment is addressed by segment register 1 and the user program data segment is addressed by segment register 2. The user process stack and user structure (u.block) are addressed by segment register 3. The user process stack grows from the high segment address to the lowest (downward). Segment registers 4 to 13 are used for the shared data manipulation in user programs. RT PC provides a programming interface to manipulate these registers via shared segment system calls.

The VRM reserves segment register 14 for direct memory access (DMA) and segment register 15 is reserved for bus I/O. This register is used to address the I/O communication channel (IOCC), floating point adapter (FPA), and memory-mapped adapters.

A process in user mode accesses the following logical areas while running. These areas are used to store information used by the process.

Text Segment: This segment is mapped by segment register 1 and is addressable by a process in user mode. The "text" segment occupies the low addresses in the virtual address space of a process. This segment usually contains the user program code that executes. The information in this segment originates from the load module that executed an "exec" system call. (The "exec" system call is briefly discussed later). During execution, this segment is read-only and a single copy of it is shared by all processes executing the same code.

Data Segment: This segment is mapped by segment register 2 and addressable by a process in user mode. The "data" segment of a user process begins on the logical boundary above the text segment. The process has read and write access to this segment. This segment is not shared by other processes and its size can be extended. This segment contains an initialized portion used for data variables such as arrays.

Stack Segment: This segment is mapped by segment register 3 and is partially addressable by a process in user mode. This segment contains the user process stack and the user structure ("u.block"). The user structure is not addressable by a process in user mode. This segment of a user process starts at the high address in the process virtual address space and automatically grows in size toward the data segment as needed. This segment contains the run-time stack for a program and user programs can write to it. The process uses the top portion of this segment to pass I/O information to the kernel.

In addition to the text, data, and stack segments that each process uses, a process can create and/or attach itself to segments that are accessible by other processes. A set of system calls are available for using shared segments. When a shared segment is created or attached, the shared segment becomes part of the address space of the requesting process.

Shared segments can be used in either a read-only mode or in a read-write mode. Note that there is no implicit serialization support when two or more processes access the same shared segment. If one process reads from a particular area of a shared segment, then it is the responsibility of the two (or more) processes to coordinate their accesses to the shared area.

In addition to the sharing of segments, system calls are available that allow a process to logically superimpose the address range of a shared segment over an ordinary file in any mounted file system. Access to the file can then be made by accessing the segment. The segment can be shared with other processes or used by a single process. There are three modes of mapping a file with a segment. They are read-write, read-only, and copy-on-write.

A file mapped read-write allows loads and stores to the segment to behave like reads and writes to the corresponding file. If a process reads that portion of the segment that is beyond the logical end of file, the process will read zeros. If the process writes into that portion of the segment that is beyond the end of file, the file is extended.

A file mapped read-only allows the file only to be read. Any attempt to write to the file by storing into the segment will signal an error to the process. Just like read-write, a process that accesses that part of the segment that is beyond the end of file reads zeros.

A file mapped copy-on-write also allows loads and stores to the segment to behave like reads and writes to the corresponding file except that the writes are temporary. That is, any storing into a copy-on-write segment modifies the segment but does not modify the corresponding file. The "fsync" system call writes the changed portions of the segment to the corresponding file, thereby making the mapped file an exact copy of the segment. If this system call is not issued, the file is never changed, allowing a process to cancel changes that it has made to a file if it decides the changes are not needed.

The following areas are addressable by a process in kernel mode. Except where noted, these areas are mapped by register 0. Data directly associated with a process are paged out of memory with the process. These areas contain all the data about a process needed by the kernel when the process is active. The four areas are:

Text: This contains kernel program code that executes. It is read only by a user process.

Global Data: This data can be addressed by any process while in kernel mode. It contains tables, such as the open file table and process table, and other data, such as buffer pointers, maintained by the kernel.

Per-Process Data: This is sometimes called the "user structure," "user area," "u.area," "user block," or "u.block." It is a portion of the user process stack segment. This area is paged with the process. It contains process information such as the current directory of files opened by the process or input and/or output (I/O) in kernel mode. This information occupies the top of the stack segment.

Stack: This area is paged with the user process. The kernel maintains a stack for each process. It saves the process information such as the call chain and local variables used by the kernel for the user process.

Figure 4:
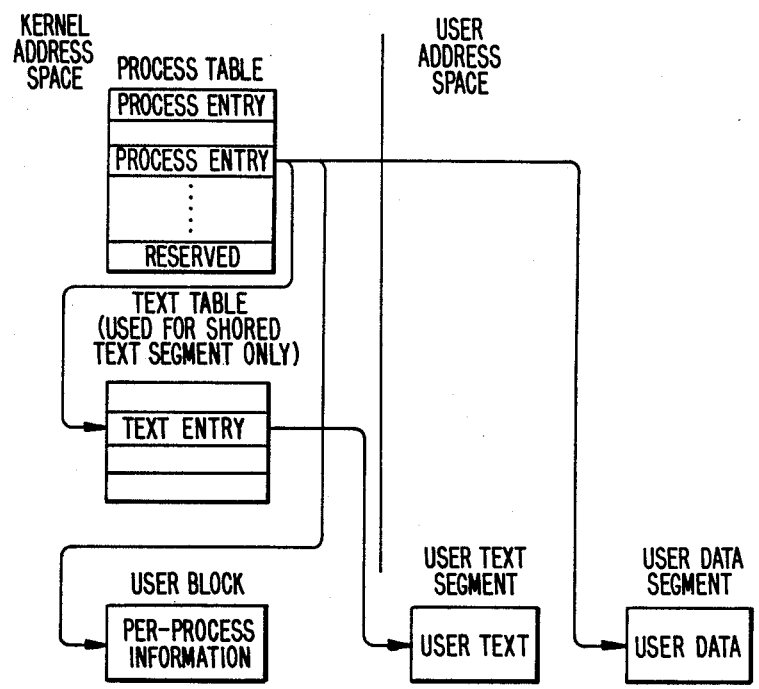
FIG. 4 shows the tables maintained by the kernel to manage processes.

Most process management performed by the kernel is table searching and modification. The kernel maintains several tables to coordinate the running of many processes. FIG. 4 shows the tables maintained by the kernel to manage processes.

The "process table" contains an entry for each process that is created. This table contains the data needed when the process is not running. This table is always in memory so the kernel can manage events for the process. Each table entry details the state of a process. The state information includes the segment IDs of the process, the identification number of the process, and the identification of the user running the process. There is one table entry for each process; therefore, the number of processes that can be created is determined by the size of the table, which is specified as a customize parameter, "procs" in the "/etc/master" file. Process creation causes an entry in the process table and process termination frees an entry in the table. One table entry is reserved for a process with "superuser" authority. A process is recognized as "superuser" process and is granted special privileges if its effective UID is 0.

Each process has its own copy of the variable segments of the process, but the text segment can be shared. Sharing program text allows more effective use of memory. When text segments are shared by processes, the system maintains a "text table." This table is used to keep track of the shared text segment for each process sharing a text segment (a parent and child can share text after a fork, as an example). The structure of this table can be found at "/usr/include/sys/text.h" in the file system. A text table entry contains the segment ID of the text segment and the number of processes sharing this entry. When the number is reduced to 0, the entry is freed along with the segment. The first process executing a shared text segment causes a text table entry to be allocated and the segment to be created. A second process executing an already allocated text segment causes the number in the text table to be incremented.

The "user structure" (also called per-process data area or user block) contains information that must be accessible while the process executes. One user structure is allocated for each active process. The user structure is directly accessible to the kernel routines. This block contains information such as user and group identification numbers for determining file access privileges, pointers into the system file table for the files opened by the process, a pointer to the i-node table entry, and a list of responses for various signals. The user structure is part of the user stack segment.

The "user data segment" contains user data. The information consists of initialized data variables. A pointer to this segment is found in the process table entry. The user text segment contains program code. A pointer to this segment is found in the process table and if shared, the text table.

Figure 5:
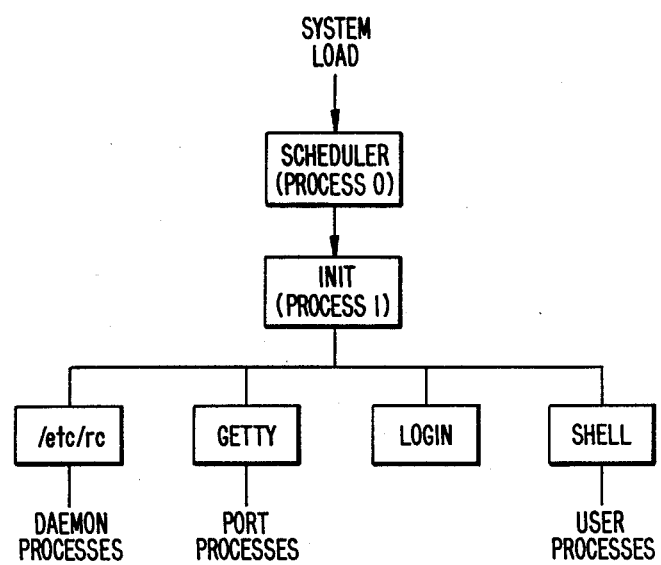
FIG. 5 illustrates how the kernel starts to build the processes when the system is initialized.

Creation and Execution: When the "/unix" file is found, it is loaded into segment 0 and executed. First, it initializes disk data structures such as the free-list blocks, I/O buffer pool, the pool of character buffers, and the list of available i-nodes. After the initialization is complete, the kernel starts to build the first process (process 0), also known as the "scheduler," as shown in FIG. 5. The scheduler is not created by the "fork" system (to be described) call like other processes and it does not contain all the parts of a process. It is a unique process that contains only a data structure to be used by the kernel. Process 0 is the first entry in the process table and active only when the processor is in kernel mode.

Process 0 creates another process (process 1) by copying itself. Process 1 is also known as "init." The system issues the equivalent of a "brk" system call to expand the size of process 1. Next, a program containing the instructions to perform an exec system call is copied into the text segment of the newly created process 1.

Process 0 is not a completed process image. The kernel will use this process for scheduling and controlling the operations of other system processes. Process 1 is the first completed process image and the ancestor of all subsequent processes. Neither process has run. The scheduler dispatches the first process that is ready to run. There is only one process ready to run, so process 1 runs. Process 1 immediately executes an exec system call to overlay itself with code from the "/etc/init" file.

As previously stated, all other process are descendents of this init process. Normally, the init process runs the shell script, /etc/rc. The "rc shell" script is responsible for performing integrity checks, doing any necessary cleanup, mounting the normal file systems, enabling standard ports. After /etc/rc runs successfully, the init process creates a "getty" using the fork system call for each enabled port specified in the /etc/ports file. The init process performs the "exec" system call to getty to determine appropriate terminal speed and modes. The getty program performs the exec system call to login to validate password, sets the user id (UID) and the group id (GID), the current directory and so on. "Login" execs shell or the program specified in the /etc/passwd file as the first program to be run after login. Shell runs in the same process created by init. Shell performs the fork system call, which creates new processes for every command. While the system is running, the init process sleeps waiting for the termination of any of its children. When a user logs out, init creates a new logger via a fork.

Parent and Child Processes: A process can, for various reasons, create a copy of itself. When this occurs the original process is called the "parent" process and the new created process called the "child" process. The major difference between the original process, the parent, and the created process, the child, is that they have different process identification numbers, parent process identification numbers, and time accounting information.

The "fork" system call causes the total number of system processes to increase. A process uses the fork system call to create a copy of itself. The fork system call causes a new. process, the child, to be created. Besides the differences mentioned previously each receives a different value from the fork system call. (The child receives the value 0 and the parent receives the ID of the child process). The two processes share open files and each process can determine whether it is the parent or the child by the value received. The parent may or may not wait for any of its children to terminate.

The "exec" system call causes the process to overlay the information it contains with new information. During an exec system call the process exchanges current text and data segments for new data and text segments. The total number of system processes does not change, only the process that issued the exec is affected. After the exec system call, the process identification number is the same and open files remain open (except close-on-exec files).

The "exit" system call terminates the process that issued the exit. All files access by that process are closed and the waiting parent is notified. A zombie process is a terminated process whose entry remains in the process table. The parent process is responsible to clear the entry from the process table. In the case of a child whose parent has terminated, init becomes the parent process clears the entry. If accounting is enable, exit writes an accounting record.

The "wait" system call suspends the calling process until the child process exits, the child stops in trace mode (the child is traced by its parent), or the caller receives a signal. A wait system call passes termination status to the parent process, one byte (high) passed by exit and one byte (low) of system status. This system call also removes zombies from the process table.

Figure 6:
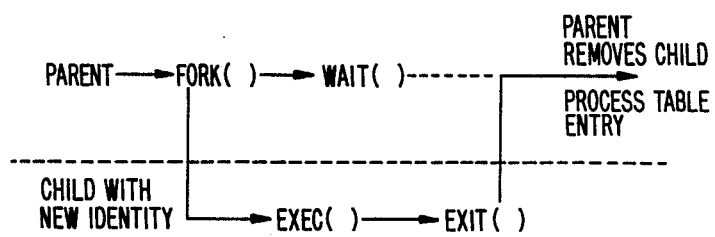
FIG. 6 illustrates a parent process and a child process relationship.

The following scenario shown in FIG. 6 discusses a parent process and child process relationship and the system calls to synchronize them. It is important to note that the parent process may terminate before the child process. In this instance, the init process assumes the role of the parent process.

A parent process executes a "fork" system call, producing a new process. The new process executes an "exec" system call creating a child process with a new identity. This is similar to the sequence "shell" uses when it runs a program. The "wait" system call causes a parent process to wait for the child to finish processing. When running interactively, the shell process executes a fork system call, the child process (shell running in the new process) executes an exec system call for the required program, and the parent process (shell) executes a wait system call to wait for the child to finish running. When the child executes an exit system call, the parent causes the process table entry for the child to be removed and prompts for another command. When running in the background, the shell process simply prints the process ID of the child and does not wait for the child process to terminate. See FIG. 6 for the relationship of the parent and child processes as described when they run interactively.

Figure 7:
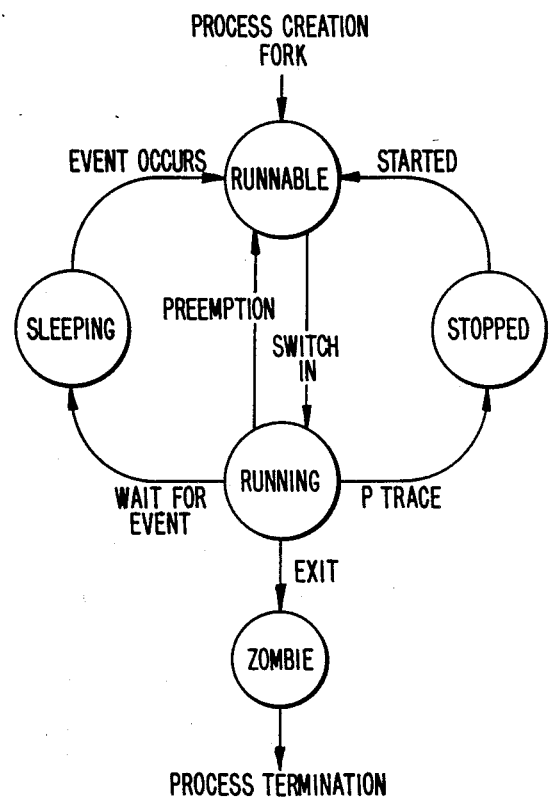
FIG. 7 illustrates how a process can be in one of several states.

States of a Process: A process can be in one of many states as shown in FIG. 7. A process can be ready to run, running, sleeping (waiting on an event), stopped, or ended. The scheduler determines which order the competing processes execute. The diagram of FIG. 7 shows the process states and the events that change the states.

Only one user process is active or running at any given time. All other user processes are suspended from running. For example, a process that is waiting for any of its children to end, waits for an event that is the address of its own process table entry. When a process terminates, it signals the event represented by the process table entry of its parent. When the event occurs, the process is awakened. When a process is awakened, it is ready to run, which means it is eligible to be dispatched. Normally, processes run to completion unless they sleep. They sleep for reasons such as waiting for input or output to complete, time slices, waiting for an event to occur or signals from other processes. At each timer interrupt, the timer interrupt routine examines the process queues, and may cause a process switch. When a process is sleeping, it may be paged out of memory. The process switch routine will not restart a process that is paged out. It checks that kernel and user data for a process are addressable before it restarts the process.

A process that relinquishes control of the processor is usually waiting for some I/O to be performed. In that case, the process issues a "sleep" call specifying "chan," which is usually the address of the kernel data structure, and specifies a wakeup priority. It normally remains sleep until a "wakeup" call is issued specifying the same chan. If the "wakeup" priority is low enough for the signal to be processed, the process is awakened and restarted in the same mode prior to sleep. Sometimes many processes may be waiting on the same event to occur, such as memory allocation. Since this is possible, when the process returns from sleep, it must first check that the event or resource was not seized by another process waiting on the same chan. If the resource is not available, the process issues another sleep call.

Signals: Signals provide communication to an active process, forcing a single set of events where the current process environment is saved, and a new one is generated. A process can designate a signal handler function to respond to the signal. The signals all have the same priority, and critical functions can protect themselves from signal interference.

A signal is an event that interrupts the normal execution of a process. The set of signals is defined by the AIX system, such as SIGINT for an interrupt. All signals have the same priority.

A process can specify a signal handler subroutine, which is to be called when a signal occurs. It can also specify that a signal is to be blocked or ignored, or that a default action is to be taken by the system when a signal occurs.

A global signal mask defines the set of signals currently blocked from delivery to a process. The signal mask for a process is initialized from that of its parent. It can be changed with a "sigblock" or "sigsetmask" system call. While a signal handler is executing, the signal that caused it to be called is blocked, but other signals can occur. When the handler finishes, the signal is again unblocked.

Normally, signal handlers execute on the current stack of the process. This can be changed, on a per-signal basis, so that signal handlers execute on a special signal stack.

When a signal is sent to a process, it is added to a set of signals pending for the process. If the signal is not currently blocked, then it is delivered to the process. When a signal is delivered, the following actions occur:

1. The current state of the process execution context is saved.

2. A new signal mask is calculated, which remains in effect for the duration of the process's signal handler or until a "sigblock" or "sigsetmask" system call is made. The new mask is formed by logically ORing the current signal mask, the signal being delivered, and the signal mask associated with the handler to be called.

3. If the signal handler is to execute on the signal stack, then the current stack is changed to the signal stack.

4. The signal handler is called. The parameters that are passed to the handler are defined in the following description.

The signal-handler subroutine can be declared as follows:

handler's name (sig, code, scp)
    "int" sig, code;
    "struc sigcontext *" scp;

The sig parameter is the signal number. The code parameter is provided only for compatibility with other UNIX-compatible systems, and its value is always zero. The scp parameter points to the "sigcontext" structure that is later used to restore the process's previous execution context.

5. If the signal-handling routine returns normally, then the previous context is restored and the process resumes at the point at which it was interrupted. The handler can cause the process to resume in a different context by calling the "longjmp" subroutine.

After a "fork" system call, the child process inherits all signals, the signal mask, and the signal stack from its parent.

The "exec" system calls reset all caught signals to the default action. Signals that cause the default action continue to do so. Ignored signals continue to be ignored, the signal mask remains the same, and the signal stack state is reset.

When the "longjmp" subroutine is called, the process leaves the signal stack, if it is currently on it, and restores the signal mask to the state when the corresponding "setjmp" call was made. The operating system has five signal classes:

1. Hardware signals occur as the result of conditions such as arithmetic exceptions, illegal instruction execution, or memory protection violations.

2. Software signals are generally user-initiated interrupts. Termination, quit, and kill are signal types that represent various levels of user or program-initiated signals to a process. In addition, timer expiration can be signaled with software-driven "alarm" signals.

3. A process can be notified of an event that occurred based on some descriptor, or nonblocking operation that completes. A process can also request a catastrophic condition signal.

4. Processes can be stopped, restarted, or can receive notification of state changes in a child process.

5. Processes can receive threshold warnings when the processing unit time limit or a file size limit is reached.

The kernel also contains additions and modifications to enhance the unsolicited interrupt signal system for kernel-to-process communications.

INVENTION EMBODIMENT IN AIX OPERATING SYSTEM

As a multi-user operating system, UNIX (TM) (UNIX is a trademark of AT&T Bell Laboratories) requires a mechanism that can prevent unauthorized program from reading data from a user terminal. The trusted path mechanism guarantees that the data typed by a user on a terminal keyboard is protected from any intrusion by unauthorized programs. The trusted path mechanism allows a user to create a non-forgeable and non-penetrable communication path between the user's terminal and the "trusted" operating system software. The user can create a trusted path simply by pressing a key, called the Secure Attention Key (SAK), on the terminal keyboard before the user logs in to the system to be sure that the user is communicating with the real login program and not a login-masquerading program with password stealing mission. After the user logs in to enter his critical data, such as password, he can be sure that it is not being stolen by an intruder's program. After the user logs out, he can be sure that the trusted path has actually logged him out from the system.

The design of the trusted path mechanism applies to any UNIX or UNIX-like (XENIX, AIX, or other) operating system.

The following changes are made in the XENIX and AIX operations systems to implement the trusted path mechanism:

1. A new key sequence consisting of one or more ASCII keys is defined that is recognized as a Secure Attention Key (SAK). The system designer can choose the SAK of his choice. It is desirable to choose a rare ASCII sequence consisting of more than one ASCII characters for the SAK.

2. A new type of UNIX signal, called SIGSAK, is added. This signal can be processed (ignored or caught) only by privileged programs. If the SIGSAK signal is sent to a non-privileged user program, it will terminate that user's program.

3. In a UNIX system a program having the effective user ID (UID) of 0 (root) is a privileged program (also called a program with the superuser privilege). Some Unix systems, which do not support the superuser privilege, provide other types of mechanisms to associate privileges with programs, e.g., Secure Xenix provides a non-superuser Generalized Privileged Mechanism (GPM) for assigning privileges to programs.

4. The line discipline driver is modified to detect the SAK from the user's hardware interrupt terminal and send the SIGSAK signal to all the processes within the controlling terminal process-group.

5. The UNIX program init is modified (i) to detect the termination of its child process due to the SIGSAK signal, (ii) to protect a user's terminal from unauthorized access during the trusted path, (iii) to run a trusted process for the user's terminal after creating a trusted path, (iv) to update the user's terminal entry in the /etc/utmp file to indicate the existence of a trusted path for the user's terminal, and (v) to detect the termination of a trusted path and create user's login environment.

6. The structure of the /etc/utmp file is modified to include the termio (terminal characteristics) parameters for the user's terminal. Also, a new flag, called TSH_.PROCESS, is added for the ut_type field of the utmp structure. This flag indicates that a trusted path has been created between the user's terminal and the operating system software, and that the running user process for the terminal is the trusted shell. The trusted shell is a restricted command interpreter that allows users to execute a set of security-critical commands, such as the passwd command to change a password.

7. The UNIX programs login and getty are modified to save the termio parameters for the terminal in the /etc/utmp file.

IMPLEMENTATION

A user can create a trusted path any time by pressing the SAK at his asynchronous terminal keyboard. The SAK operates in both raw and cooked I/O (input/output) modes of the terminal. The user can press the SAK at login time to make sure that the user is communicating with the real login program and not a login-spoofing program. Or, the user can press the SAK after login to perform secure operations, such as changing a password. Or, the user can press the SAK after the logs out to make sure that he has actually logged out from the system. The following provides a layered design of the trusted path mechanism.

DETECTION OF THE SAK

When the user presses the SAK, the terminal driver receives the keys (ASCII characters) and passes them to the line discipline driver. When the line discipline driver receives the keys, it performs the following operations:

1. If more than one key is chosen for the SAK, the line discipline driver holds the initial keys until all the keys for the SAK are typed or the key sequence breaks or a given timeout, called the SAK-timeout, occurs. If the typed key sequence is not the SAK, then the line discipline driver passes the key(s) to the application, as it usually does.

2. When the line discipline driver detects the SAK, it sends the SIGSAK signal to all the processes within the controlling terminal process-group. Any process (including the user's top-level process, usually a shell), which receives the SIGSAK signal, but cannot ignore or catch it, terminates.

DETECTION OF THE SIGSAK SIGNAL

When a process, which is a child of init, terminates due to the SIGSAK signal from the line discipline driver, init receives the SIGCLD (death of a child) signal along with the exit-status of the child process. Init then detects the occurrence of the SIGSAK signal by reading the exit-status of its child process. The init process has the process ID of one. We call a child process of init (i.e., a process having the parent process ID of one) as a top-level process.

CREATION OF A TRUSTED PATH

Upon detecting the SIGSAK signal from the exit-status of a child process, init creates a trusted path between the user's terminal and the "trusted" operating system software and runs a trusted program on the terminal depending on the state of the running process on the terminal before the SAK was pressed. We will now discuss the operations performed by init for creating a trusted path and executing a trusted process.

BEFORE LOGIN

If a user presses the SAK before login, the top-level process for an enabled terminal is either getty or login, which is also in that terminal's process-group. The ut_type field for each record in the /etc/utmp file indicates the type of the running process for that terminal. The ut_type field for getty and login is INIT_PROCESS and LOGIN_PROCESS respectively in the /etc/utmp file. When the user presses the SAK, the line discipline driver sends the SIGSAK signal to all the processes within the controlling terminal process-group. As a result all the processes, including the getty or login process, running on that terminal, terminate.

Init detects, by reading exit-status of its child process, that the child process terminates due to the SIGSAK signal. Init then finds the type of that running process by reading the ut_type field for the terminal entry in the /etc/utmp file. In this case, the ut_type is either INIT_PROCESS, if getty was running, or LOGIN_PROCESS, if login was running. Init then creates (forks) a new child process. In the child process, it changes the access mode of the terminal to -rw- (readable and writable by the owner only), changes the owner ID and group ID to root (UID=0; GID=0), opens the terminal and revokes the read/write access for that terminal to all the processes using the vhangup system call. This would clean the terminal from any previous access by programs. This creates a trusted path for the user's terminal and protects the terminal from reading and writing by unauthorized programs.

Because of the access mode and ownership, only a superuser (root) can now open the terminal. Init being the superuser program now reopens the terminal and executes (execs) the getty process (a trusted process), which prompts the user for a new login.

AFTER LOGIN

If a user presses the SAK after login, the top-level process is a user process, which is also in the terminal's process-group. The ut_type field for a user process is either USER_PROCESS or TSH_PROCESS in the /etc/utmp file. When a user presses the SAK, the line discipline driver sends the SIGSAK signal to all the processes within the controlling terminal process-group. As a result all the processes, including the top-level user process, running on that terminal, terminate.

Init detects, by reading the exit-status of its child (user) process, that the child process terminates due to the SIGSAK signal. Init then finds the type of that running process by reading the ut_type field for the terminal entry in the /etc/utmp file. In this case, the ut_type is either USER_PROCESS, if the trusted path was not created, or TSH_PROCESS, if the trusted path was already created. Init then forks a new child process. In the child process, it changes the access mode of the terminal to -rw- (readable and writable by the owner only), changes the owner ID and group ID to root (UID=0; GID=0), opens the terminal and revokes the read/write access for that terminal to all the processes using the vhangup system call. This would clean the terminal from any previous access by programs. This creates a trusted path for the user's terminal and protects the terminal from reading and writing by unauthorized programs.

Because of the access mode and ownership, only a privileged program can now open the terminal. Init being a privileged program now reopens the terminal, and changes the ut_type field for that terminal entry to TSH_PROCESS in the /etc/utmp file, sets the termio parameters of the terminal to the termio values for that terminal entry defined in the /etc/utmp file, and then execs the trusted shell.

If the user presses the SAK again while in the trusted shell, the same set of operations are performed as when the user is logged in and not created the trusted path. Thus, the current trusted shell is terminated, a new trusted path is created and the trusted shell is executed again for that terminal.

When the user exits the trusted shell, init detects that it was a trusted shell by reading the corresponding /etc/utmp entry. It then changes the ut_type field for the terminal entry to USER_PROCESS in the /etc/utmp file, creates the login environment for the user including termio parameters, and runs the user's login-program (usually a login-shell).

AFTER LOGOUT

If the user presses the SAK after logout, it will have the same effect as before login as described above.

Reference now to FIG. 8 will show the state diagram illustrating when the SAK is pressed. The state S1 is before login when the system is talking to the real login program. State S2 is after a successful login but it is not in the trusted path. The state S3 is after a successful login but it is in the trusted path; that is in the trusted shell TSH. As can be seen in FIG. 8, when the user turns on his terminal, he enters the state S1. If he were to press the Secure Attention Key SAK at this time or alternately if he were to have an unsuccessful login, he would continue to remain in the state S1. Alternately, if the user has a successful login, then he will pass from the state S1 into the state S2. The user in the state S2 can exit from the login shell by pressing a selected combination of keys and return to the state S1. Alternately, the user in the state S2 can do normal untrusted work and remain in the state S2, operating within the shell SH. Alternately, if the user desires to engage in transactions between his terminal and the trusted computing base using a trusted path, then the user when in state S2, presses the Secure Attention Key (SAK). This transfers the user to the state S3. The user can leave the state S3 exiting the trusted shell TSH by pressing the selected combination of keys, thereby returning to the untrusted shell SH in the state S2. Alternately, the user in the state S3 can press the Secure Attention Key SAK or alternately he can run a trusted shell command, both of which will cause him to remain in the trusted shell of state S3. After the user has completed the tasks to be performed within the trusted shell in state S3, he will exit the trusted shell and will return to the state S2.

Figure 15:
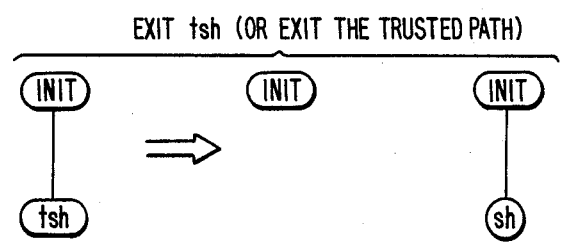
FIG. 15 follows FIG. 14 and shows that the trusted shell TSH performs an exit function thereby terminating the trusted path which has been established between the user terminal and the trusted computer base.

The sequence of FIGS. 9–15 describe how a trusted path is established between the user's terminal and the trusted computing base, how the trusted shell is used and then terminated so that the user exits and returns from his trusted path to normal untrusted operations. FIG. 9 shows the init process. FIG. 10 follows FIG. 9 and shows the init calling a fork to create a child process and then the child process execs a getty process that prints the initial login prompt and determines terminal characteristics. FIG. 11 follows FIG. 10 and shows when a user types his user name to the getty, the getty execs the login process. FIG. 12 follows FIG. 11 showing that after a successful login, the login process execs the login shell specified for that user, for example SH. FIG. 13 follows FIG. 12 and shows that when the user presses the Secure Attention Key (SAK) the line discipline driver sends a SIGSAK signal to all processes in the controlling terminal process group. In response, the login shell SH dies and the init process forks a new child process which in turn execs a trusted shell process TSH. FIG. 14 follows FIG. 13 and shows that if the password program is run within the trusted shell TSH, then TSH forks a child process which in turn execs password. When the password process is over, the trusted shell TSH is still running. FIG. 15 follows FIG. 14 and shows that the trusted shell TSH performs an exit function thereby terminating the trusted path which has been established between the user terminal and the trusted computer base.

Figure 16:
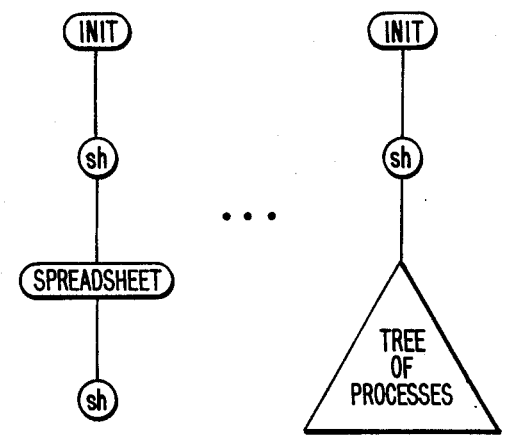
FIG. 16 shows an alternate condition to that shown in FIG. 12, wherein a plurality of processes can be executed under the shell SH in a multiprogramming or multiprocessing operation.
Figure 17:
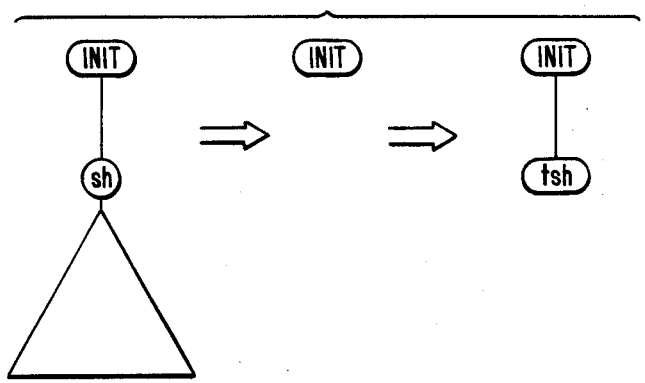
FIG. 17 follows FIG. 16 and is an alternate circumstance to that shown in FIG. 13, wherein when the Secure Attention Key is pressed thereby issuing the SIGSAK signal, the shell SH with its plurality of operating processes is terminated and the init process creates the trusted shell TSH, thereby establishing a trusted path, as was previously described.

FIGS. 16 and 17 illustrate an alternate condition for the application of the invention, where the shell SH is conducting multiprocessing or multiprogramming operations with a plurality of application processes. FIG. 16 shows an alternate condition to that shown in FIG. 12, wherein a plurality of processes can be executed under the shell SH in a multiprogramming or multiprocessing operation. FIG. 17 follows FIG. 16 and is an alternate circumstance to that shown in FIG. 13, wherein when the Secure Attention Key is pressed thereby issuing the SIGSAK signal, the shell SH with its plurality of operating processes is terminated and the init process creates the trusted shell TSH, thereby establishing a trusted path, as was previously described.

Figure 18:
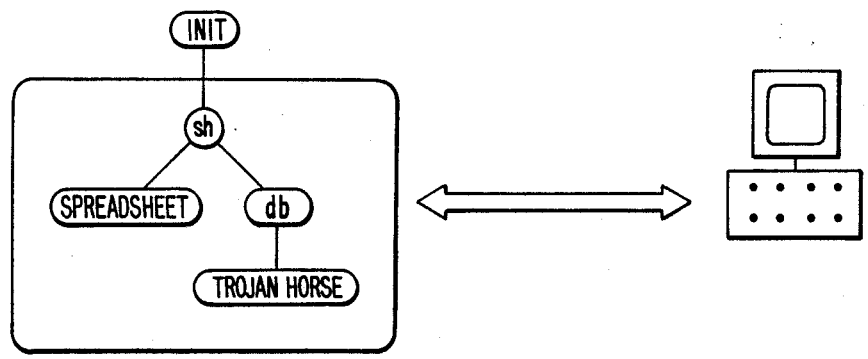
FIG. 18 is a schematic diagram of a processing state for the system wherein the shell SH is running two processes a spreadsheet process and a data base (DB) process attached to which is a Trojan horse program.
Figure 19:
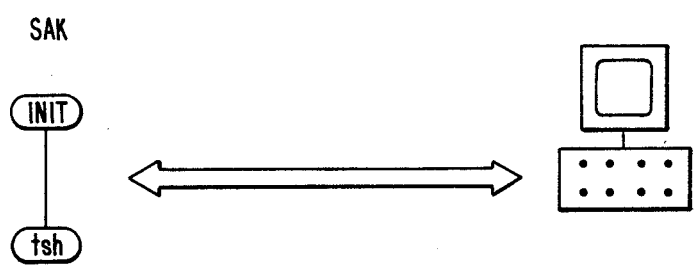
FIG. 19 shows how the user can establish a trusted path between his terminal and the trusted computing base by pressing his Secure Attention Key (SAK) which causes the destruction of the shell SH and its corresponding spreadsheet program process, data base manager process, and most importantly, the destruction of the Trojan horse program.
Figure 20:
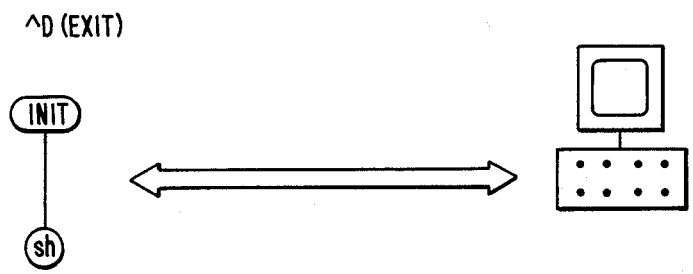
FIG. 20 shows that after the trusted shell TSH process has accomplished the task desired by the user over its trusted path, the trusted shell TSH will undergo a natural termination or exit, thereby causing the init to recreate the shell SH.

FIGS. 18, 19 and 20 show in a schematic representation, how a shell SH which is operating in a multiprocessing or multiprogramming mode and has contained within it a Trojan horse program, is converted by the user into a trusted path so that the user can carry out secure communications between his terminal and the trusted computer base. FIG. 18 is a schematic diagram of a processing state for the system wherein the shell SH is running two processes, a spreadsheet process and a data base (DB) process attached to which is a Trojan horse program. FIG. 19 shows how the user can establish a trusted path between his terminal and the trusted computing base by pressing his Secure Attention Key (SAK) which causes the destruction of the shell SH and its corresponding spreadsheet program process, data base manager process, and most importantly, the destruction of the Trojan horse program. FIG. 19 shows the init process creating the trusted shell TSH process. FIG. 20 shows that after the trusted shell TSH process has accomplished the task desired by the user over its trusted path, the trusted shell TSH will undergo a natural termination or exit, thereby causing the init to recreate the shell SH.

In order to establish a trusted path in a reliable manner, the computer system unit must be physically secure. The system unit must have sufficient physical security so that unauthorized persons cannot open up the cabinet and obtain access to the hard disk inside. Furthermore, the system unit must be so configured that the user cannot load any arbitrary operating system. The only operating system that should be permitted for loading is the secure UNIX-like operating system, in accordance with the invention. One way to achieve the exclusion of nonsecure UNIX-like operating systems from being loaded is to prevent the user from booting operating systems off of floppy diskettes inserted into the system unit. This can be done quite simply by changing the connectors inside the system unit so that the default drive is not a floppy disk drive but instead is the hard disk upon which resides the secure UNIX-like operating system. Still further, every software module that executes from the time the system unit has its power turned on, must be a trusted software module. The read only memory must be a trusted software module and must be considered as a part of the trusted computer base. All code which it executes in loading the secure UNIX-like operating system is assumed to be a part of the trusted computer base. With these caveats, the user can safely assume that he is starting out with a secure state when booting up his operating system.

Figure 21:
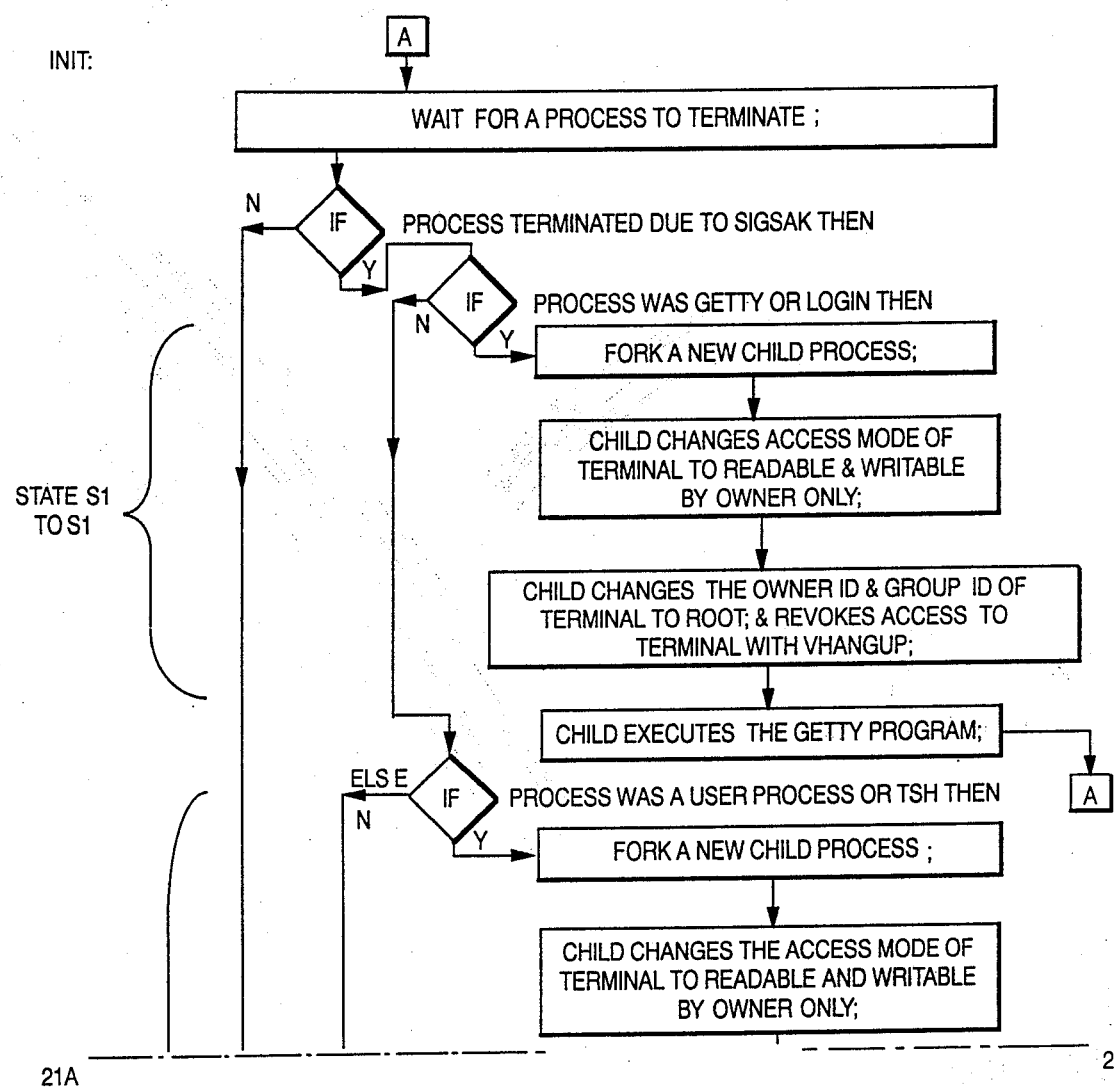
FIGS. 21 and 21A are flow diagrams of the init process, in accordance with the invention.
Figure 21A:
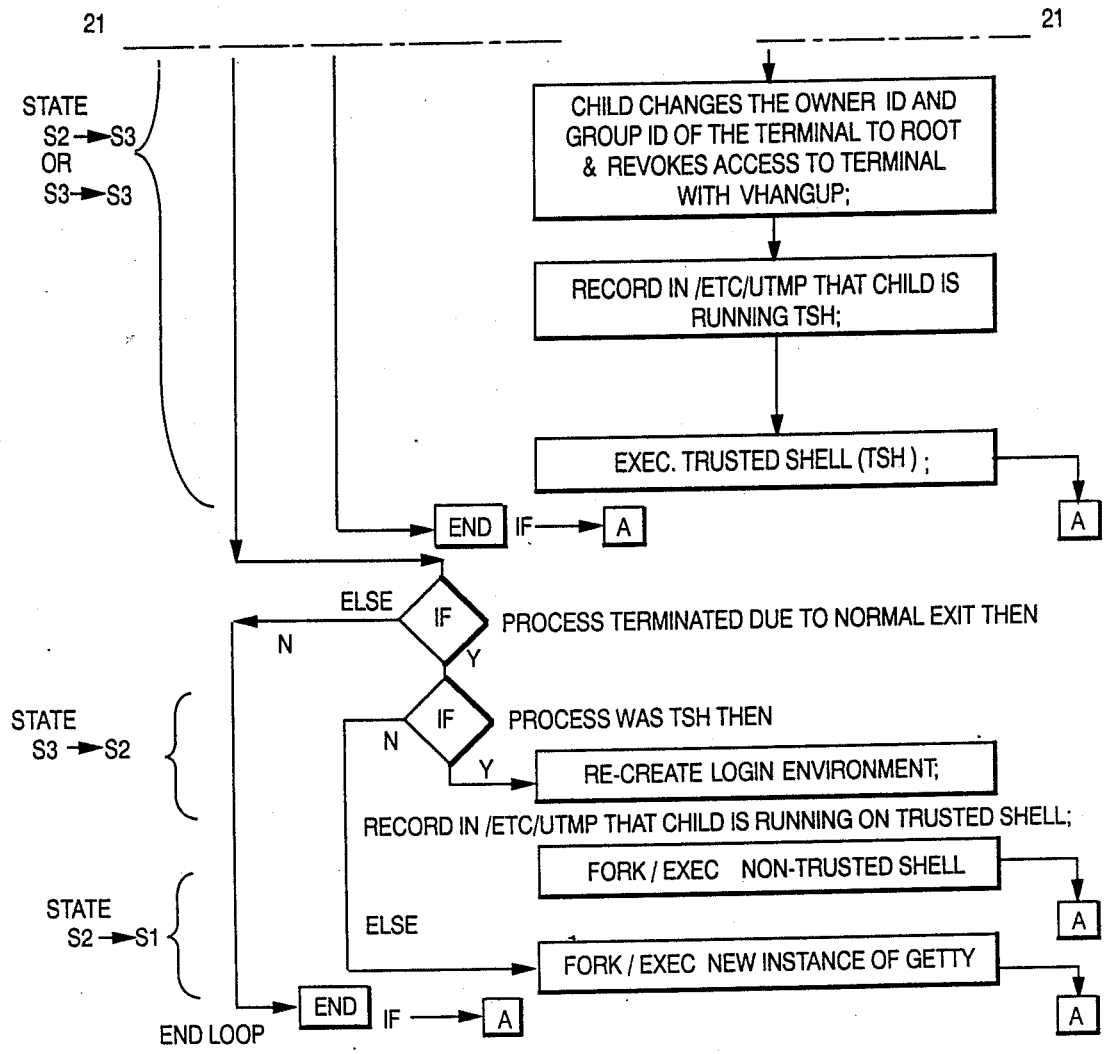

Table 1 shows a pseudo code representation of the init process, in accordance with the invention. The pseudo code in Table 1 shows those aspects of the init process that are related to the Secure Attention Key. FIG. 21 is a flow diagram of the pseudo code in Table 1. Init is a loop which waits until some process terminates. Based on how that process terminated and what process terminated, init takes alternate actions. The first statement in Table 1 is to wait for some process to terminate. There are really four cases: either the process can terminate through the SIGSAK or through a normal exit. If it terminates through the SIGSAK, it could either be the getty process or login process, or it could be a user who has already logged in and has a user process running. In the case of a normal exit, it could be the trusted shell or any other process. There are four types of actions that init can take depending upon who terminated. If the process terminated due to a normal exit and it was not the trusted shell, then all init does is create a new instance of getty. This would be the case where a user has logged out. The user currently has a shell running and he logs out and that shell terminates. When that shell terminates, init detects it in the first statement of Table 1 and determines that it was a normal exit and it was not a trusted shell so init creates a new instance of getty which displays a new login prompt. That would be the normal logout case.

In the case where the user has pressed the Secure Attention Key before he has logged in, the user already has a login prompt, but he does not trust it, so he wants to press the Secure Attention Key. In that case, init would detect that the process terminated due to the Secure Attention Key, and then init checks what kind of process it was. It was either getty or it was login. In that case, what init does is, trade a new trial process. Init executes operations that effectively sever any access to the user's terminal that other processes may have. Init does that by changing the access mode to the user's terminal to readable and writable by the owner only, changing the ownership of the terminal to the root, and revoking access to the terminal with the vhangup command. Then init will perform an exec system call to overlay another copy of the getty program. When the user hits the Secure Attention Key when he is logged out, init detects that and it cleans up the environment for safety purposes and then creates a new instance of getty.

The next case is where a user has already logged in and he presses the Secure Attention Key. In that case, he is either running with an ordinary process or he already has a trusted shell. In either case init is going to clean up the environment and give him a trusted shell. Init does a fork system call for a new child, the child changes the access modes on the user's terminal so that nobody else can access that terminal, changes the ownership ID and revokes access using the vhangup command and then it records in the /etc/utmp file the fact that the child is now running the trusted shell and then performs an exec system call to overlay the trusted shell. In this manner, the trusted path is established.

The way the trusted shell terminates is the next case. Assuming the user is now running the trusted shell, he is done with it and he presses termination keys, for example control D. When that happens init detects at the top of the loop in Table 1 that a process is terminated, but this time its termination is due to a normal exit, because the user pressed control D. Init looks at who it was that terminated and init sees that it was the trusted shell. So instead of logging the user out, what init is going to do is to create a new non-trusted shell. So init recreates the login environment, init records a record in the /etc/utmp that essentially reminds us that the child is now running an untrusted shell, and then init performs a fork system call followed by an exec system call to overlay a non-trusted shell. So there are four situations. Init waits for a process to terminate and then decides which of the four situations has actually occurred and performs those operations for those four situations.

The sequence of FIGS. 8-20 can now be reviewed in the light of the operation of the init process, in accordance with the invention, as has been described above with reference to Table 1. FIG. 8 is a state diagram that shows one of three states that a process could be in. State 1 is before login when the user is talking to the real login program. State 2 is the state that the user will go into immediately after he has successfully logged in, but before he has ever used the Secure Attention Key and finally state 3 is when the user is actually in the trusted shell, after he has pressed the Secure Attention Key. Let us say I am the user and I start out in state S1 and I am talking to the real login. There are one of two things that I can do; either I can successfully log in or I can press the Secure Attention Key. If I press the Secure Attention Key, I immediately come back to state 1. In other words I stay in the before-login state. However, if I specify my name and a correct password, then I have successfully logged in and I move to state S2 which means that I now have an ordinary shell (a non-trusted shell) and I am in the normal environment. From state S2, I can do whatever my normal untrusted work is and I just remain in state S2 as I am doing my normal work. However, if I want to go into the trusted shell, then I will press the Secure Attention Key. When I press the Secure Attention Key, I move from state S2 into state S3 which is the trusted shell. From here, I will stay in state S3 even if I repeatedly press the Secure Attention Key. In other words, once I am in the trusted shell, repeated instances of pressing the Secure Attention Key will leave me in state S3. The way I get back to the previous states is by pressing control D or doing a normal exit. So if I am in the trusted shell and I do a normal exit with control D, then I will go back into the ordinary non-trusted shell and from there, if I press the control D, I go back into the first state which is the logout state.

Moving to FIG. 9, we show the sequence of the processes as they are created and destroyed. Initially, when the system is brought up, there is a single process init and init is the top-level parent of all the processes on the system. FIG. 9 shows our initial state and FIG. 10 shows what happens when init creates the very first process. In this case, it is "getty" and getty is the process that will display the initial login prompt on the screen. It will say the name of the machine and login. This process is primarily responsible for listening to the terminal and determining what transmission speed the terminal is operating at and reading the name of the user who is going to log in.

FIG. 11 then shows what happens after getty has successfully read the user's name and has detected the correct speed of the terminal, it then overlays itself by calling exec and requesting that the system execute the login program. The login program is now primarily responsible for authenticating the user. In other words, it will prompt the user for a password and it compares this password or it encrypts the password and compares the encrypted password against an encrypted list of passwords that are on one of the system files called /etc/passwd. If there is a match, then the login is successful and we move on to FIG. 12. If it is not successful, then the login repeatedly prompts for user name and password.

Moving on to FIG. 12, if the login was successful, the login program will overlay itself with the shell by using "exec" and giving it the name of the shell. At this point, we now have the parent process init and its immediate descendant is running the shell or the command interpreter for UNIX. In this state, the user can do his normal work and this corresponds to state S2 in FIG. 8. Let us assume that the user decides he wants to go into the trusted shell.

FIG. 13 shows three stages. The first stage shows init with the shell and then if the user presses the Secure Attention Key, the first thing that happens is that the shell will be terminated. When the shell is terminated, we now have init by itself and init detects the termination of the shell and creates in its place, the trusted shell. Now we are in state S3 where the user can do his work in the trusted shell. That establishes the trusted path.

The details of how the trusted path is established are in the pseudo code. FIG. 13 shows init with the shell "SH." If the user presses the Secure Attention Key, that will cause the shell to be terminated. In the pseudo code of Table 1, we see that init waits for a process to terminate, the process did terminate due to SIGSAK and the process was a user process or shell in this case. So the steps that init performs to establish the trusted path are to fork a new child process, which is shown between the second step and the third step in FIG. 13, the system goes from init to init with the child. The trusted path is established by changing the access mode of the user's terminal to readable and writable by the owner only, changing the owner ID and group ID of the terminal to root and revoking the access to the terminal with the vhangup command. Those steps establish the trusted path. Init then records in the /etc/utmp file that the child is running the trusted shell and init performs an exec of the trusted shell which gives us the final step in FIG. 13.

From FIG. 13 we assume that the user is going to execute some commands from the trusted shell. If the user for example wants to change his password, he would type the password command and that would create the first transition shown on FIG. 14 where we now have init with the trusted shell as its immediate descendant and the password command as its descendant below that. Then when that password command terminates, we go back to the situation where we just have init and the trusted shell. What FIG. 14 shows, is running the trusted shell, issuing the command and having that command execute and then returning to the trusted shell.

To move on to FIG. 15, let us assume that the user is done using the trusted shell and wants to go back to the ordinary shell. This picture shows what happens when we move from state S3 to state S2 in the original state diagram of FIG. 8. If the user presses control D to the trusted shell, the trusted shell terminates and init then recreates the trusted shell. Referring to the pseudo code in Table 1, by starting again at the top of the loop, init waits for a process to terminate, and when init detects that the process is terminated, init looks under what circumstance it terminated. Since the user did a normal exit from the trusted shell, init goes to the statement that the process terminated due to normal exit. Then init looks at what kind of process terminated. In this case, it was the trusted shell. So init performs three steps. The first thing init does is recreate the login environment, which means create a process that has that particular user ID and reinitialize the environment as it was originally when the user logged in. Init records in the /etc/utmp file that the child will now be running an untrusted shell as opposed to the trusted shell, and then init performs the fork-exec system call sequence to overlay a non-trusted shell, which leaves us at the third step in FIG. 15.

FIG. 16 shows an example of shell "SH" running several processes underneath it. For example after a user has logged in, whether he has a trusted shell or a normal shell, as he executes commands, it creates processes that are immediate descendants of that shell, so that the first view shows a shell "SH" that is running a spreadsheet and then the spreadsheet in turn has created a further subshell SH to run other operating system commands. The second view in FIG. 16 shows init with the shell SH and a tree of processes which represents any number of processes that are being executed from that particular shell.

FIG. 17 shows what will happen in the case where the user presses the Secure Attention Key and we have more than just the shell SH. In other words, assume that as a user, we were operating in the normal untrusted shell and we are running a whole collection of programs, say various application programs and you press the Secure Attention Key. This picture shows that not only does the shell SH terminate, but that all the processes that are running underneath of the shell SH, that is all the application programs are terminated as well.

FIG. 18 shows the relationship between a collection of processes and a terminal, showing specific examples of the types of processes that might be running. FIG. 18 shows a shell SH with a spreadsheet and a data base and let us assume the data base has run some program that has in it a Trojan horse. All those are connected to and are talking to a particular terminal. When the user presses the Secure Attention Key in all those processes, the shell, the spreadsheet, the data base and the Trojan horse, are immediately terminated and in its place is put the trusted shell TSH, which is now connected to the terminal. When the user is done using the trusted shell and presses the control D in FIG. 20, init deletes the trusted shell and in its place puts the ordinary untrusted shell SH which is now connected to the terminal.

TABLE 1

```
Init:
begin loop
Wait for a process to terminate;
if process terminated due to SIGSAK then
    if process was getty or login then
    fork a new child process;
    child changes access mode of
    terminal to readable and writable
    by owner only;
    child changes the owner ID
    and group ID of terminal to root; and
    revokes access to terminal with vhangup;
    child executes the getty program;
    else if process was a user process or TSH then
    fork a new child process;
    child changes the access mode of
    terminal to readable and writable
    by owner only;
    child changes the owner ID and
    group ID of the terminal to root
    and revokes access to terminal with vhangup;
    record in /etc/utmp that child is
    running TSH;
    exec trusted shell (TSH);
    end if
else if process terminated due to normal exit then
    if process was TSH then
    recreate login environment;
    record in /etc/utmp that child is running
    untrusted shell;
    fork/exec non-trusted shell
    else
    fork/exec new instance of getty
    end if
```

TABLE 1-continued end loop

The trusted path mechanism for an operating system disclosed herein provides a trusted path mechanism which can prevent unauthorized programs from reading data from a user terminal. The trusted path mechanism guarantees that the data typed by a user on a terminal keyboard is protected from any intrusion by unauthorized programs. The trusted path mechanism allows the user to create a non-forgeable and non-penetrable communication path between the user's terminal and the trusted operating system software.

Although a specific embodiment of the invention has been disclosed, it will be understood by those having skill in the art that changes can be made to that specific embodiment without departing from the spirit and the scope of the invention.

What is claimed is:

1. A method in a UNIX-type operating system for creating, in response to a secure attention request signal from a Secure Attention Key, a trusted path between a terminal connected to a data processor running an init process under said operating system and a trusted shell portion of a trusted computing base in said data processor, comprising the steps of:
    testing for the termination of an existing process running under the control of said init process;
    executing a fork system call by said init process for a new child process when said existing process terminates due to said secure attention request signal from a Secure Attention Key;
    changing the access mode of the terminal to be accessible by said init process;
    revoking access to the terminal by all other processes except said init process;
    executing an exec system call to overlay said trusted shell onto said new child process;
    changing the access mode of the terminal to be accessible by said trusted shell.

2. A method in a UNIX-like operating system for creating, in response to a secure attention request signal from a Secure Attention Key, a trusted path between a terminal connected to a data processor running a trusted init process under said operating system and a trusted shell portion of a trusted computing base in said data processor, comprising the steps of:
    waiting for the termination of an existing process running under the control of said trusted init process;
    executing a fork system call by said trusted init process to create a child process when said existing process terminates due to a secure attention request signal from a Secure Attention Key and said existing process was a getty or a login process, changing the access mode of said terminal to be accessible by said init process, revoking access to said terminal by all other processes except said init process, executing an exec system call to overlay a new getty process onto said new child process, and executing the new getty process;
    executing a fork system call by said trusted init process for a new child process when said existing process terminates due to a secure attention request signal from a Secure Attention Key and said existing process was a user process or a trusted shell, changing the access mode of said terminal to be accessible by said init process, revoking access to said terminal by all other processes except said init process, recording that said child is running a trusted shell, and executing an exec system call to overlay a trusted shell onto said child process, changing the access mode of the terminal to be accessible by said trusted shell, thereby establishing the trusted path;
    executing a fork system call by said trusted init process for a new child process when said existing process terminates due to a normal exit and said existing process was a trusted shell, recording that the new child process is running an untrusted process, executing an exec system call to overlay an untrusted process onto said new child process;
    executing a fork system call by said trusted init process for a new child process when said existing process terminates due to a normal exit and said existing process was an untrusted process, executing an exec system call to overlay a getty process onto said child process to provide a login function for a new session at said terminal.

3. The method of claim 2 wherein the secure attention request is recognized by a UNIX-type operating system as an interrupt SIGSAK signal.

4. The method of claim 3 wherein any user-defined key combination entered at said terminal can be employed as said secure attention request.

5. The method of claim 4 wherein a timeout is established for the generation of a complete secure attention request sequence, whereby keys which are chosen can be used with the timeout as regular keys of said terminal.

6. The method of claim 5 wherein the initial key is held in a line discipline driver and not sent to an application process until either the sequence breaks or the secure attention request timeout occurs, thereby avoiding emulation of a trusted path by unauthorized programs.

7. In a data processing system including a memory to which is connected a plurality of terminals, with at least one terminal including a keyboard having a Secure Attention Key, a method in a UNIX-type operating system for creating, in response to said Secure Attention Key, a trusted path between said terminal and a trusted shell portion of a trusted computing base which is a child process of an init process under said operating system, comprising the steps of:
    detecting said Secure Attention Key in a keyboard device driver connected to said keyboard;
    outputting from said keyboard device driver to a Secure Attention Key Signal Generator, information that said Secure Attention Key has been detected;
    outputting from said Secure Attention Key Generator a SIGSAK signal to all processes operating in a process group of said terminal, terminating all of said processes in said terminal process group;
    applying said SIGSAK signal to access authorization tables associated with all device drivers interfacing with said terminal, to deny access authorization to all processes in said data processing system except said init process;
    applying said SIGSAK signal to a file access table to remove all addressing information relating said device drivers interfacing with said terminal, to all processes in said data processing system except said init process;

executing a fork system call by said init process for a new child process;

executing an exec system call to overlay a trusted shell process onto said new child process, said trusted shell process having access authorization to said device drivers interfacing with said terminal and said trusted shell process having an addressing relationship defined in said file access table to said device drivers interfacing with said terminal;

whereby a trusted path is established between said terminal and said trusted shell process.

* * * * *